(12) United States Patent
Gardiner

(10) Patent No.: US 6,539,913 B1
(45) Date of Patent: Apr. 1, 2003

(54) ROTARY INTERNAL COMBUSTION ENGINE

(76) Inventor: William P. Gardiner, 259 Polk #219, Wickes, AR (US) 71973

( * ) Notice: Subject to any disclaimer, the term of this patent is extended or adjusted under 35 U.S.C. 154(b) by 0 days.

(21) Appl. No.: 10/047,369

(22) Filed: Jan. 14, 2002

(51) Int. Cl.$^7$ .................................................. F02B 53/04
(52) U.S. Cl. ........................ 123/231; 123/236; 123/209; 123/228; 418/122; 418/150
(58) Field of Search ................................. 123/236, 231, 123/228, 209, 244; 418/231, 233, 222

(56) References Cited

U.S. PATENT DOCUMENTS

| | | | |
|---|---|---|---|
| 631,815 A | | 8/1899 | Pratt |
| 879,512 A | | 2/1908 | Braunwaler |
| 939,751 A | * | 11/1909 | Schulz ........................ 123/231 |
| 1,228,806 A | | 6/1917 | Morris |
| 1,309,096 A | | 7/1919 | Leibing |
| 1,646,695 A | | 10/1927 | Hubbard |
| 1,827,094 A | | 10/1931 | McCann |
| 1,853,563 A | | 4/1932 | Hungerford et al. |
| 1,990,660 A | | 2/1935 | McCann |
| 2,036,060 A | | 3/1936 | Lewis |
| 2,124,542 A | | 7/1938 | Chisholm |
| 2,129,960 A | | 9/1938 | Presby |
| 2,179,401 A | * | 11/1939 | Chkliar ........................ 123/231 |
| 2,217,796 A | | 10/1940 | Dell |
| 2,728,330 A | | 12/1955 | Petersen |
| 3,251,348 A | | 5/1966 | Unruh |
| 3,364,967 A | * | 1/1968 | Jeanson ........................ 418/122 |
| 3,452,723 A | | 7/1969 | Keylwert |
| 3,572,030 A | * | 3/1971 | Cuff ........................ 123/231 |
| 3,603,326 A | | 9/1971 | Pearson et al. |
| 3,712,274 A | | 1/1973 | Craft |
| 3,745,979 A | * | 7/1973 | Williams ........................ 123/231 |
| 3,777,721 A | | 12/1973 | Sawada |
| 3,779,215 A | | 12/1973 | Sabet |
| 3,782,110 A | * | 1/1974 | Kobayashi ........................ 123/231 |
| 3,797,464 A | | 3/1974 | Abbey |
| 3,809,021 A | | 5/1974 | Lamm |
| 3,820,515 A | * | 6/1974 | Knisch ........................ 123/236 |
| 3,827,411 A | | 8/1974 | Lamm et al. |
| 3,854,456 A | | 12/1974 | Ishii et al. |
| 3,867,911 A | | 2/1975 | Keylwert |
| 3,868,753 A | | 3/1975 | Springer et al. |
| 3,882,828 A | | 5/1975 | Honiden |
| 3,918,413 A | | 11/1975 | Eiermann et al. |
| 3,931,810 A | | 1/1976 | McGathey |
| 3,939,655 A | | 2/1976 | Ruf et al. |
| 3,947,162 A | | 3/1976 | Lamm |
| 3,954,088 A | | 5/1976 | Scott |
| 3,955,539 A | | 5/1976 | Scherenberg |
| 3,957,021 A | * | 5/1976 | Loyd, Jr. ........................ 123/209 |
| 3,964,446 A | | 6/1976 | Kohno et al. |
| 3,964,450 A | | 6/1976 | Lockshaw |

(List continued on next page.)

FOREIGN PATENT DOCUMENTS

| | | | | |
|---|---|---|---|---|
| DE | 27 25 036 A1 | * | 12/1978 | |
| DE | 30 41 893 A1 | * | 5/1982 | |
| GB | 2 212 216 A | * | 7/1989 | ................. 123/242 |

Primary Examiner—Thomas Denion
Assistant Examiner—Thai-Ba Trieu

(57) ABSTRACT

The present invention provides an internal combustion engine and a method of manufacturing the internal combustion engine. The internal combustion engine comprises a housing, a first rotor, first and second impellers and a compression cam. In a preferred embodiment, the housing has a first inner surface defining a first cavity therein, the first rotor is journalled for rotation within the first cavity and is situated to define compression and exhaust cavities on opposing sides therein, first and second impellers located in, and slidable with respect to, first and second opposing radial apertures in the first rotor, and the compression cam is fixedly coupled to the housing. The compression cam has a working surface portion that corresponds to a profile of the inner surface to force the first and second impellers to contact the inner surface and a dead surface portion that departs from the profile to allow the first and second impellers to withdraw from the inner surface.

60 Claims, 29 Drawing Sheets

U.S. PATENT DOCUMENTS

| | | |
|---|---|---|
| 3,973,525 A | 8/1976 | Keylwert |
| 3,975,122 A | 8/1976 | Hackbarth et al. |
| 3,985,476 A | 10/1976 | Hofbauer |
| 3,994,642 A | 11/1976 | Johannes |
| 4,003,346 A | 1/1977 | Kohno |
| 4,005,955 A | 2/1977 | Pamlin |
| 4,020,799 A | 5/1977 | Ishikawa |
| 4,020,800 A | 5/1977 | Ishikawa |
| 4,023,534 A | 5/1977 | Ishikawa |
| 4,023,535 A | 5/1977 | Ishikawa |
| 4,037,999 A | 7/1977 | Armin et al. |
| 4,040,391 A | 8/1977 | Zeilinger ............... 123/209 |
| 4,063,535 A | 12/1977 | Eiermann |
| 4,080,935 A | 3/1978 | Olson |
| 4,100,911 A | 7/1978 | Kromer |
| 4,102,616 A | 7/1978 | Ishikawa |
| 4,169,451 A | 10/1979 | Niggemeyer |
| 4,169,452 A | 10/1979 | Steinwart et al. |
| 4,237,848 A | 12/1980 | Korzhov et al. |
| 4,286,555 A | 9/1981 | Williams |
| 4,370,109 A | 1/1983 | Sabet et al. |
| 4,434,757 A | 3/1984 | Walker |
| 4,515,514 A * | 5/1985 | Hayase et al. ............ 418/150 |
| 4,653,446 A | 3/1987 | Frasca ................... 123/244 |
| 4,671,231 A | 6/1987 | Hu |
| 4,717,319 A | 1/1988 | Eiermann |
| 4,793,304 A | 12/1988 | Eiermann |
| 4,911,624 A | 3/1990 | Bagepalli |
| 5,011,387 A | 4/1991 | Speiser |
| 5,049,049 A | 9/1991 | Eiermann |
| 5,067,557 A | 11/1991 | Nuber et al. |
| 5,271,364 A | 12/1993 | Snyder |
| 5,357,923 A | 10/1994 | Osterburg et al. |
| 5,441,018 A | 8/1995 | Almassi |
| 5,452,996 A | 9/1995 | Eiermann et al. |
| 5,484,272 A | 1/1996 | Horn |
| 5,494,014 A | 2/1996 | Lobb |
| 5,865,152 A | 2/1999 | Murphy et al. |
| 6,062,188 A | 5/2000 | Okamura |
| 6,125,814 A | 10/2000 | Tang |

\* cited by examiner m=2    m=3    m=4

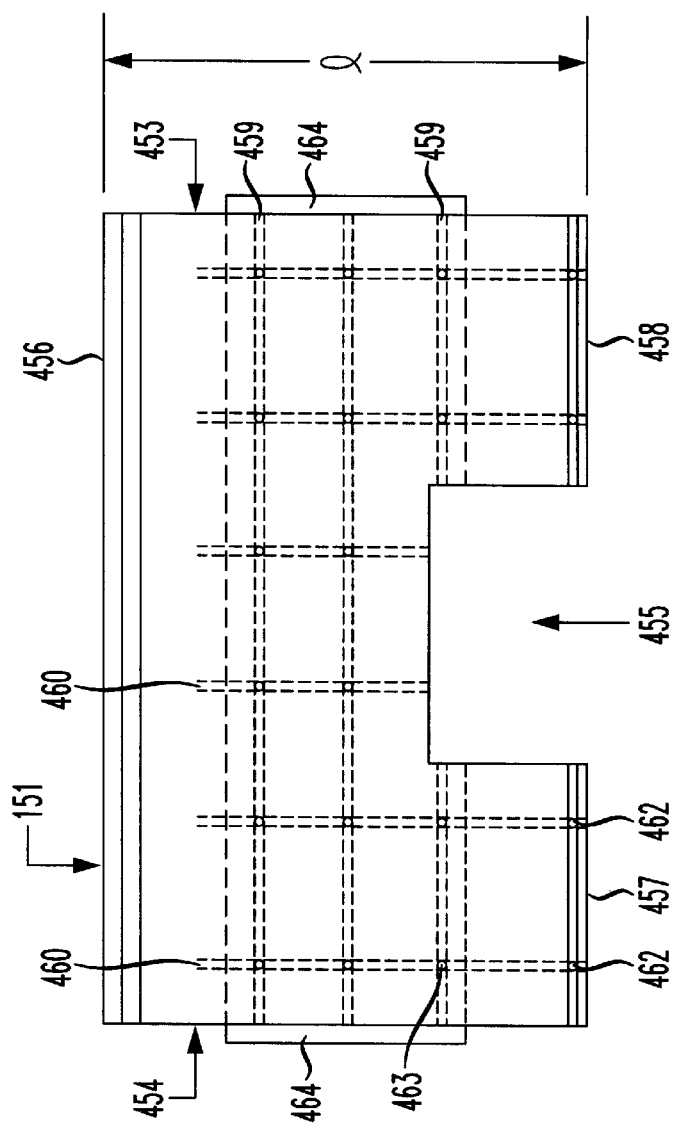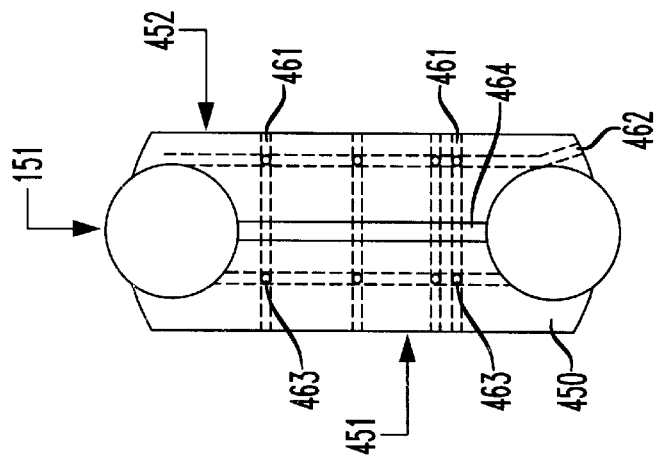

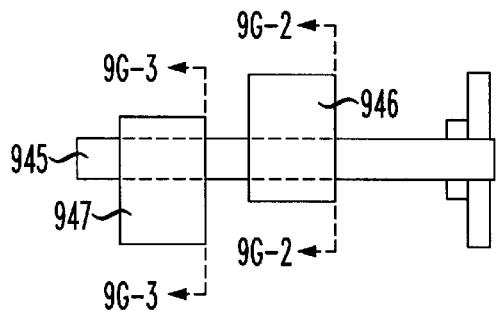
FIG. 9G-1
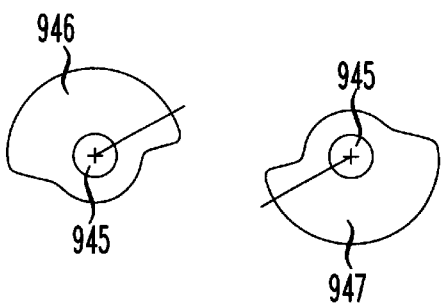
FIG. 9G-2
FIG. 9G-3
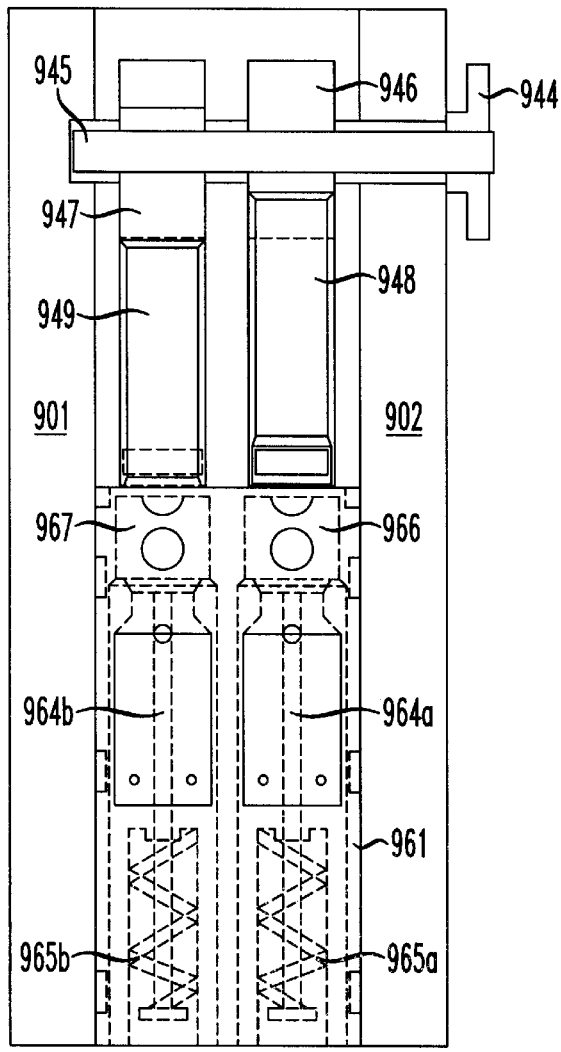
FIG. 9G-4

ROTARY INTERNAL COMBUSTION ENGINE

TECHNICAL FIELD OF THE INVENTION

The present invention is directed, in general, to an internal combustion engine and, more specifically, to a rotary internal combustion engine having a rotor that is directly coupled to a drive shaft without eccentric gearing.

BACKGROUND OF THE INVENTION

A conventional internal combustion reciprocating engine converts reciprocating motion of a piston within a cylinder into rotating motion via a crankshaft having offset sections coupled to a connecting rod mechanism. While long the standard for internal combustion engines, a four-stroke, or four-cycle, internal combustion reciprocating engine creates power by causing a metal piston to move up and down twice per combustion cycle in a cylinder bore, thereby varying the instantaneous size of the combustion chamber, to achieve one power stroke. This often vertical or inclined motion is changed to a rotational flywheel motion by connecting the piston to an eccentric portion of the crankshaft with a connecting rod. Inertial forces at the top and bottom of each stroke of the reciprocating piston invariably cause vibration and high internal stresses on the engine components. These vibrations and stresses increase with increasing crankshaft angular velocity measured in revolutions per minute (rpm). Only about 50 to 60 percent of total combustion gas pressure exerted on the piston is converted into useable output torque of the crankshaft due primarily to the characteristics of the crank/connecting rod mechanism. In a conventional reciprocating engine essentially all of the pressure generated by the combustion is useful in pushing the piston to do work. However, much of the energy lost in a conventional reciprocating engine is caused by the redirection of a linear motion of the piston into a rotary motion of the crankshaft.

Due to a valve overlap period in which both the intake valve and the exhaust valve are open even after exhaust is expelled, a small amount of combustion gas remains in the combustion chamber and, therefore, it is difficult to both improve on the combustibility of the mixture and to decrease the amount of unburned gas. Meanwhile, the structure of the crank mechanism and valve operating mechanism, that is: the camshaft, intake valves and exhaust valves; is quite complex and requires precise adjustment. It is therefore difficult to decrease vibration and noise caused by the reciprocating motion of the piston. It is also difficult to revise the size of the four-cycle reciprocating engine without decreasing the output horsepower of the engine.

An alternative embodiment of the internal combustion engine that has enjoyed significant development is the rotary engine. The rotary engines of interest are not to be confused with the rotary aircraft engines of the early 20th Century. These rotary aircraft engines comprise a crankshaft fixed to the aircraft structure and a plurality of cylinders radially positioned about the crankshaft such that the crankshaft remains fixedly coupled to the vehicle, in this instance an aircraft, while the engine block, cylinders and pistons, rotate about the crankshaft. The propeller is fixedly coupled to the engine block and rotates with the engine block assembly. By contrast, the rotary engine used in automotive applications employs an engine block fixed to the vehicle and an internally rotating "piston" that causes a drive shaft to rotate relative to the vehicle.

Accordingly, until present, various kinds of rotary-piston type internal combustion engines, also know as rotary piston engines, have been proposed. More specifically, rotary piston engines can be classified as either: (a) direct-rotation type rotary piston engines having a rotor rotating coaxially with the output shaft or, (b) planetary-rotation type rotary piston engines having a rotor geared to and rotating eccentrically about the output shaft. As the structure of classical approaches to the former, i.e., direct-rotation engines, has generally been believed to be more complex than that of the latter, i.e., planetary-rotation engines, the former has generally not been put into practical use. However, the Wankel rotary piston engine, an example of the planetary-rotation engine has seen considerable development and has been put to practical use since the 1930's.

In the Wankel rotary engine, an arciform deltoid rotor is held within a rotor holding bore which has an inner surface cross section that is similar to a peritrochoidal curve. The conformance to a peritrochoidal profile is driven by the requirement that all three bearing points of the Wankel rotor remain in constant contact with the inner surface of the engine. The rotor is rotated in a planetary motion through the engaging of a rotor gear on the rotor with a gear on an output shaft. The location of the arciform deltoid rotor within the rotor holding bore creates three chambers therein. Depending on the planetary motion of the rotor, while the chambers outside of the rotor vary their capacities, four strokes of intake (suction), compression, combustion (expansion) and exhaust are performed. Because of the peritrochoidal chamber, the Wankel has an exhaust cavity immediately following the ignition point that rapidly enlarges. This causes a significant portion of the gas pressure to be lost as expansion within the enlarging cavity, and not converting the expansion pressure into useable torque. It is also notable that in the Wankel engine, the combustion gas pressure is exerted on both: (a) a pressure-receiving rotor surface facing, but just rotationally beyond, the point of combustion, and (b) a trailing portion of the rotor surface facing, but that is rotationally before the point of combustion. This pressure on the trailing portion of the rotor surface effectively attempts to drive the rotor in reverse, thereby reducing the engine efficiency. Therefore, it is generally accepted that only about 60 to 70 percent of the combustion gas pressure received by the rotor can be converted into output torque. Significantly, the architecture of the Wankel engine, i.e., a peritrochoidal section, makes it difficult to improve the combustibility in the combustion stroke and to decrease the exhaust quantity of unburned gases.

Until present, various types of direct-rotation rotary engines have been proposed. FIGS. 12–17 show highly schematic, well-known, direct-rotation rotary engines 300A–300F. FIG. 18 shows a direct-rotation rotary engine 300G put into practical use by Malorie Co. This engine 300G has a housing 300, a rotor 301, a suction port 302, an ignition plug 303, an exhaust port 304 and a scavenging port 305 with the rotor 301 rotating clockwise. An engine 300H shown in FIG. 18 is provided with a housing 310, a suction port 311, an exhaust port 312, a rotor holding bore 313, a rotor 314 coaxial with the bore 313, cycloid tooth portions 315, 316 formed on the rotor 314, a first small cylindrical driven rotor 317, a second small cylindrical driven rotor 318, a combustion subchamber 323 and an exhaust chamber 324. A prototype of this engine 300H made in about 1945 was reported to have high output horse power performance notwithstanding its small and light structure. However, the engine was not put into practical use after its development.

Next, descriptions will be given concerning technical problems of the above prior art. In the various direct-rotation engines 300A–300F shown in FIGS. 12–17, the axial center of the rotor is eccentric to the axial center of the rotor holding bore, and presumably some portion of the combustion gases will generate an intrinsically reverse-driving torque. Thus, it is difficult to improve the efficiency in converting the combustion gas pressure into output torque. For an engine having plural cylinders, a straight output shaft cannot be applied, and moreover, the structure of the output shaft becomes complicated and engine vibrations will occur due to this eccentric structure.

Other problems include: (a) difficulty in providing adequate durability of gas sealing members and engine parts, (b) some of the above engines also require an intake valve and an exhaust valve, and (c) difficulty in sufficiently lengthening the suction period and the exhaust period. In the direct-rotation rotary engine 300 shown in FIG. 18, the structure is complex due to its many components, and thus manufacturing costs become high. The direct rotation rotary engine 300H shown in FIG. 19 is superior due to its simple structure, yet there remain some problems in the reliability and durability of gas sealing mechanisms between the cycloid tooth portions and small cylinders. Also, it is difficult to sufficiently lengthen the periods of suction stroke and exhaust stroke which are opposed at 180 degrees of the rotor rotation angle.

Accordingly, what is needed in the art is an internal combustion engine that does not suffer from the deficiencies of the prior art while taking advantage of the energy conversion efficiency of a direct-rotation rotary engine.

SUMMARY OF THE INVENTION

To address the above-discussed deficiencies of the prior art, the present invention provides an internal combustion engine and a method of manufacturing the internal combustion engine. The internal combustion engine comprises a housing, a first rotor, first and second impellers and a compression cam. In a preferred embodiment, the housing has a first inner surface defining a first cavity therein, the first rotor is journalled for rotation within the first cavity and is situated to define compression and exhaust cavities on opposing sides therein, first and second impellers located in, and slidable with respect to, first and second opposing radial apertures in the first rotor, and the compression cam is fixedly coupled to the housing. The compression cam has a working surface portion that corresponds to a profile of the inner surface to force the first and second impellers to contact the inner surface and a dead surface portion that departs from the profile to allow the first and second impellers to withdraw from the inner surface.

Thus, in a global sense, the present invention provides a direct-rotation, internal combustion, rotary engine comprising a symmetrical rotor that rotates concentrically within a cavity of an engine housing. The rotor includes two opposing radial apertures wherein are located two impellers that ride upon a working surface of a cam and contact the inner surface of the cavity during compression and power strokes, and a dead surface portion wherein the impellers withdraw from the inner surface between the compression and power strokes.

In a preferred embodiment, the profile has a modified peritrochoidal form. In one embodiment, a peripheral surface of the first rotor seals against at least a portion of the inner surface. In a preferred embodiment, the first rotor comprises an outer flywheel and an inner hub and the engine further comprises a drive shaft having a longitudinal axis coincident a central axis of the housing. The drive shaft is coupled to the inner hub; and the outer flywheel has the first and second opposing radial apertures therethrough.

In another embodiment, the internal combustion engine further comprises a lubrication system coupled to front and rear engine covers and in fluid communication with the first rotor and the compression cam. In one embodiment, the compression cam is coupled the front engine cover and the engine further comprises an combustion cam coupled the first rotor.

In another embodiment, the internal combustion engine further comprises a fuel metering system coupled the housing and in fluid communication with the compression cavity and the exhaust cavity. In yet another embodiment, the internal combustion engine further comprises an ignition system coupled the housing and configured to ignite a fuel/air mixture in the ignition chamber.

In one embodiment, the internal combustion engine further comprises an intake aperture through the housing and in fluid communication between the atmosphere and the compression cavity, and an exhaust aperture through the housing and in fluid communication between the atmosphere and the exhaust cavity. In yet another embodiment, the internal combustion engine further comprises a cooling system coupled the housing.

The present invention further provides an internal combustion system comprising an internal combustion engine, as described, and a transmission coupled to the internal combustion engine.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 4A illustrates an end view of the first impeller of FIGS. 1A through 1D;

FIG. 4B illustrates a side view of the first impeller of FIGS. 1A through 1D;

FIG. 9C-2 illustrates a plan view of the power stroke cam of FIG. 9C-1;

FIG. 9C-3 illustrates a partial bottom view of the combustion head of FIG. 9A;

FIG. 9C-4 illustrates a three-view drawing of the power stroke valve of FIG. 9A;

FIG. 9G-1 illustrates a side view of the timing camshaft and first and second power stroke cams of FIG. 9F;

FIG. 9G-2 illustrates a plan view of the first power stroke cam of FIG. 9G-1;

FIG. 9G-3 illustrates a plan view of the second power stroke cam of FIG. 9G-1 in relation to the first power stroke cam;

FIG. 9G-4 illustrates a bottom view of the combustion head of FIG. 9F;

DETAILED DESCRIPTION

Figure 1A:
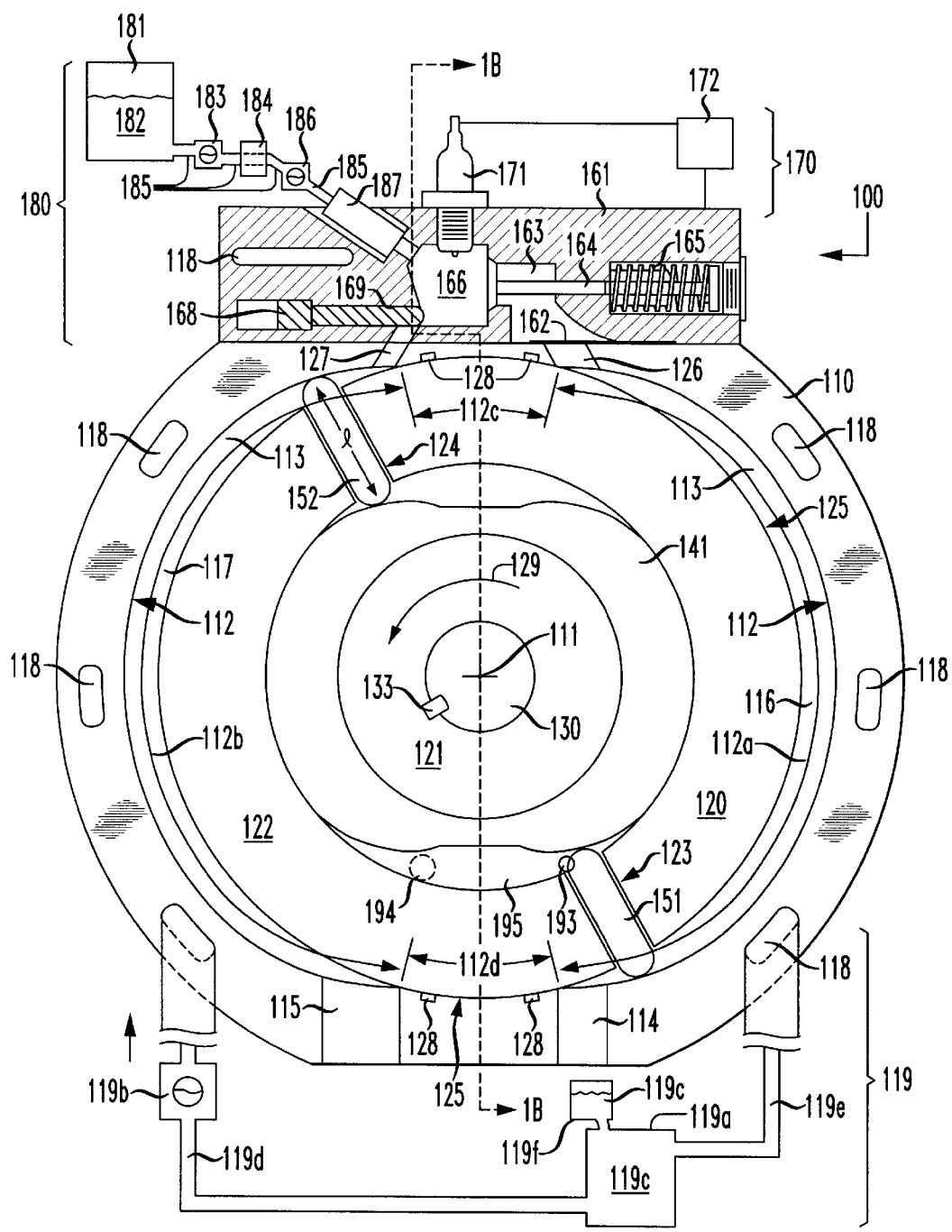
FIG. 1A illustrates a front elevation sectional view of the elements of an internal combustion engine as seen along plane 1A—1A shown in FIG. 1B.
Figure 1B:
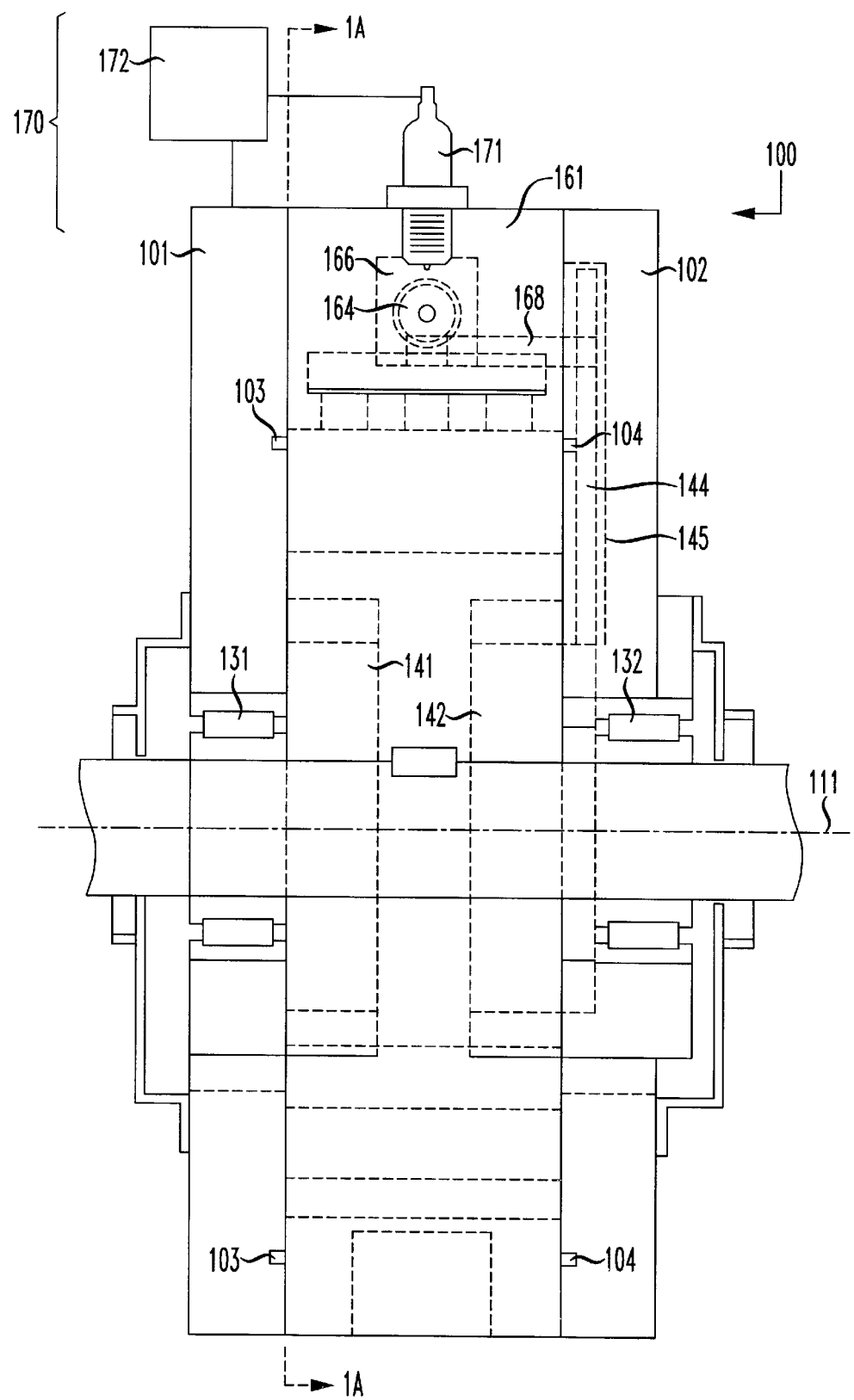
FIG. 1B illustrates a left side elevation, sectional view of the elements of the internal combustion engine as shown in FIG. 1A.
Figure 1C:
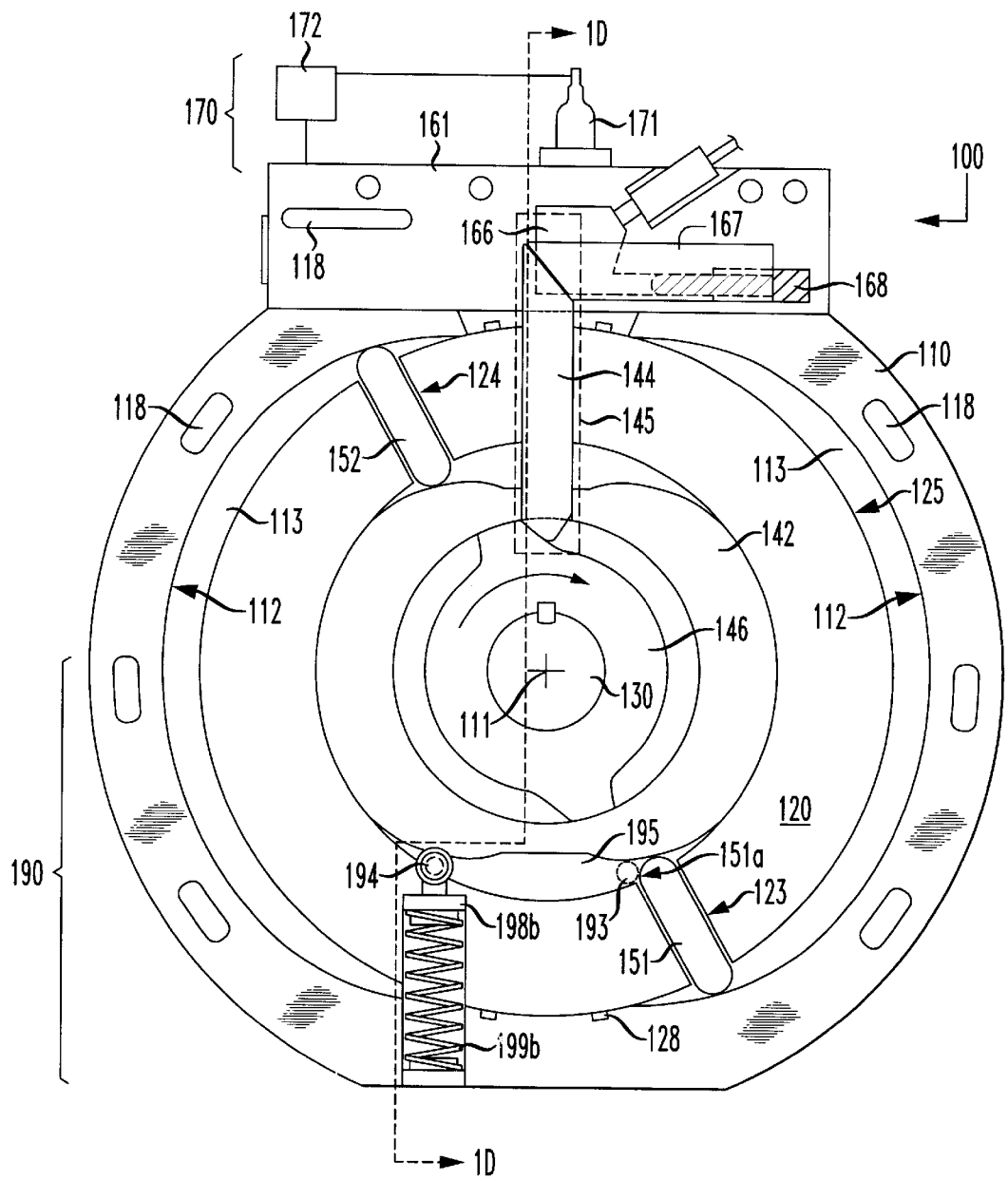
FIG. 1C illustrates a rear elevation view of the elements of the internal combustion engine as seen along plane 1C—1C shown in FIG. 1D.
Figure 1D:
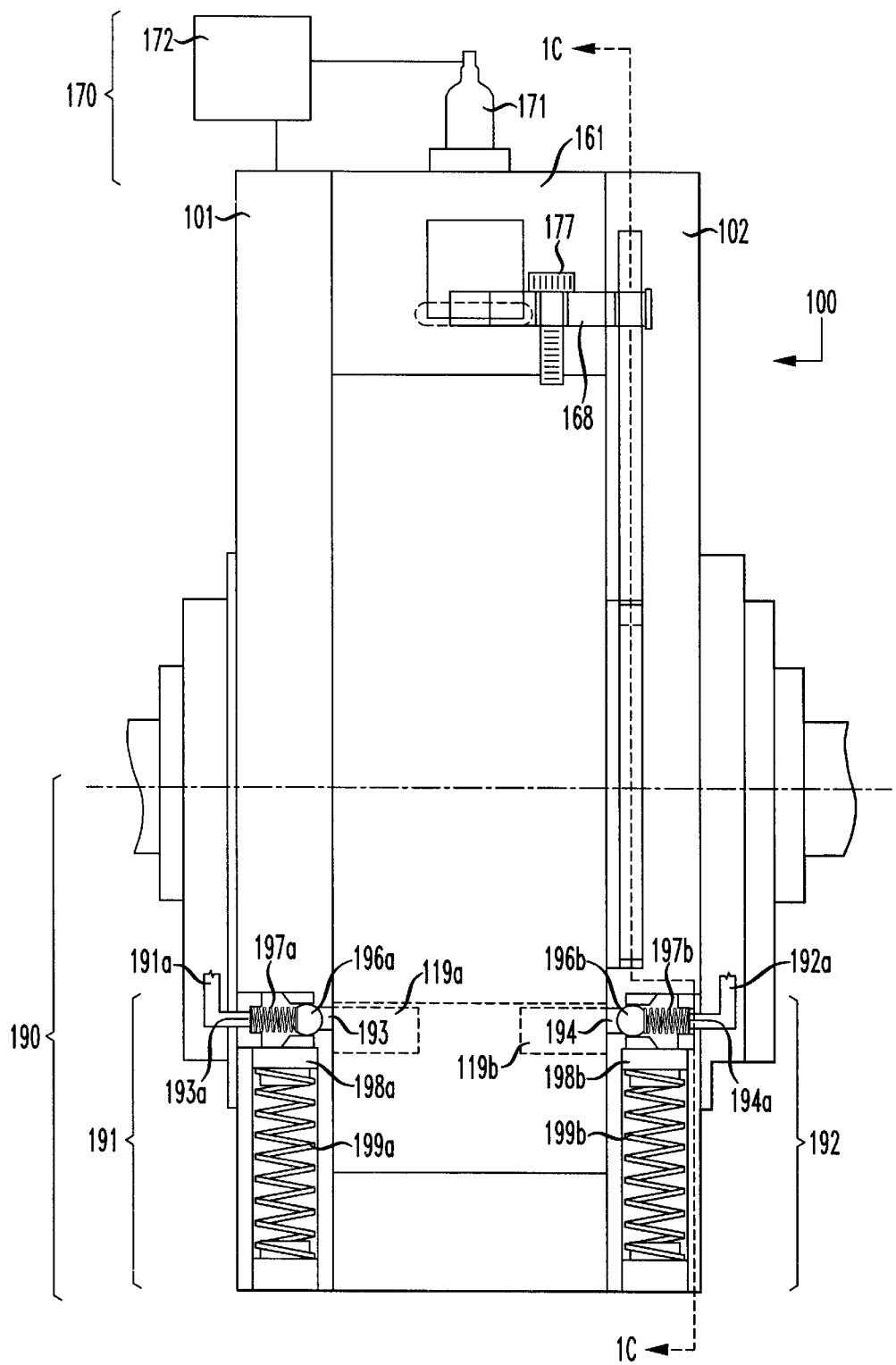
FIG. 1D illustrates a second, left side elevation, sectional view of the elements of the internal combustion engine as seen along plane 1D—1D shown in FIG. 1C.

Referring initially to FIGS. 1A through 1D, illustrated are: a front elevation sectional view (FIG. 1A), a left side elevation, sectional view (FIG. 1B), a rear elevation, sectional view (FIG. 1C), and a second left side elevation, sectional view (FIG. 1D) of the elements of one embodiment of an internal combustion engine 100 constructed according to the principles of the present invention. FIG. 1A illustrates the elements of the internal combustion engine 100 as seen along plane 1A—1A shown in FIG. 1B, that is with a front engine cover removed. FIG. 1B illustrates the elements of the internal combustion engine 100 as seen along plane 1B—1B shown in FIG. 1A. FIG. 1C illustrates the elements of the internal combustion engine 100 as seen along plane 1C—1C shown in FIG. 1D, that is essentially with a rear engine cover removed. FIG. 1D illustrates the elements of the internal combustion engine 100 as seen along plane 1D—1D shown in FIG. 1C.

In a preferred embodiment, the internal combustion engine 100 comprises an engine housing 110; front and rear engine covers 101, 102; front and rear rotor seals 103, 104; a first rotor 120; a drive shaft 130; first and second compression cams 141, 142; a first push bar 144; a radial rabbet 145; a combustion cam 146; first and second impellers 151, 152; a combustion head 161; an ignition system 170; a fuel metering system 180; and a lubrication system 190. The first push bar 144 slides essentially vertically within the radial rabbet 145 located in the front engine cover 101. The engine housing 110 has a central axis 111 and an inner surface 112. The engine housing 110 may comprise steel, aluminum, ceramic or other suitable structural material. The inner surface 112 delimits a first cavity 113 in the engine housing 110.

The first rotor 120 is journalled for rotation with first and second main bearings 131, 132, respectively, within the first cavity 113 and is positioned within the first cavity 113 so as to define compression and exhaust cavities 116, 117, respectively, on opposing sides therein. The compression cavity 116 and exhaust cavity 117 are, therefore, essentially equal in volume. The engine housing 110 further comprises an air inlet aperture 114 and an exhaust aperture 115 therethrough that are in fluid communication with the atmosphere. A conventional muffler system (not shown) may be coupled to the exhaust aperture 115 to quiet the engine 100 and to route exhaust gases away from the air inlet aperture 114. One who is skilled in the art is familiar with the need to take in ambient air to mix with a fuel for an internal combustion engine and the expelling and muffling of exhaust gases to the ambient air. Cooling cavities 118 are disposed throughout the engine housing 110 and combustion head 161 and are configured to carry a heat transfer liquid therein. In a preferred embodiment, the heat transfer liquid may be a conventional engine antifreeze mixture, i.e., ethylene glycol and water.

The engine housing 110 comprises a compressed air inlet port 126 in fluid communication with the compression cavity 116 and an exhaust gas port 127 in fluid communication with the exhaust cavity 117. The combustion head 161 comprises a reed valve 162, a preignition chamber 163, a poppet 164, a poppet spring 165, an ignition chamber 166, a second push bar 167, a pivot bar 168, and a power stroke valve 169. The ignition system 170 comprises a spark plug 171 and a voltage generating system 172 (shown in a functional block diagram). One who is skilled in the art is familiar with the design and operation of conventional ignition systems.

The fuel metering system 180 comprises a fuel tank 181, fuel 182, a fuel pump 183, a fuel filter 184, fuel lines 185, a fuel injection pump 186, and a fuel injector 187. The engine 100 may use any suitable fuel, e.g., gasoline, ethanol, etc. For the sake of consistency, unleaded regular gasoline will be the fuel 182. The fuel pump 183 may be engine-driven by tapping power from the drive shaft 130, or may be electrically-driven by an engine-driven alternator (not shown). Fuel 182 is drawn from the fuel tank 181 by the fuel pump 183 and forced through the fuel lines 185 to the fuel filter 184 and then to the fuel injection pump 186 that allocates precise amounts of fuel 182 through the fuel injector 187 to the ignition chamber 166.

The lubrication system 190 comprises first and second oil scavengers 191, 192; first and second lubrication apertures 193, 194; first and second secondary lubrication apertures 193a, 194a, an oil sump 195, and first and second lubrication distribution tubes 191a, 192a. The first oil scavenger 191 comprises a first check ball 196a, a first spring 197a, a first piston 198a, and a second spring 199a. The second oil scavenger 192 comprises a second check ball 196b, a third spring 197b, a second piston 198b, and a fourth spring 199b. Oil under pressure is available at the first and second secondary lubrication apertures 193a, 194a as the impellers 151, 152 force their way through the oil sump 195 during rotation. The first and second lubrication distribution tubes 191a, 192a route lubricating oil under pressure from the first and second secondary lubrication apertures 193a, 194a to those areas of the engine, e.g., the poppet 164, the power stroke valve 169, etc., that do not receive direct lubrication as do the impellers 151, 152. The details of how the first and second lubrication distribution tubes 191a, 192a may be coupled to those areas with conventional tubing is well known in the art.

In a preferred embodiment, the internal combustion engine 100 further comprises a cooling system 119 having a radiator 119a; a coolant pump 119b; coolant 119c; supply and return coolant hoses 119d, 119e, respectively; cooling cavities 118 in the engine housing 110; and a coolant recovery tank 119f. The coolant pump 119b is coupled to, and receives power from, the drive shaft 130. One who is skilled in the art is familiar with coupling coolant pumps to an engine drive shaft. The coolant pump 119b draws coolant 119c through the supply coolant hoses 119d from the radiator 119a. The coolant pump 119b then pumps the coolant 119c through the cooling cavities 118, back through the return coolant hoses 119e and into the radiator 119a where excess heat is removed. The process continues automatically whenever the engine 100 is operating. The coolant recovery tank 119f keeps the radiator 119a, hoses 119d, 119e, and the cooling cavities 118 filled with liquid coolant 119c regardless of the temperature of the coolant 119c. One who is skilled in the art is familiar with the design and function of an internal combustion engine cooling system 119.

Figure 2A:
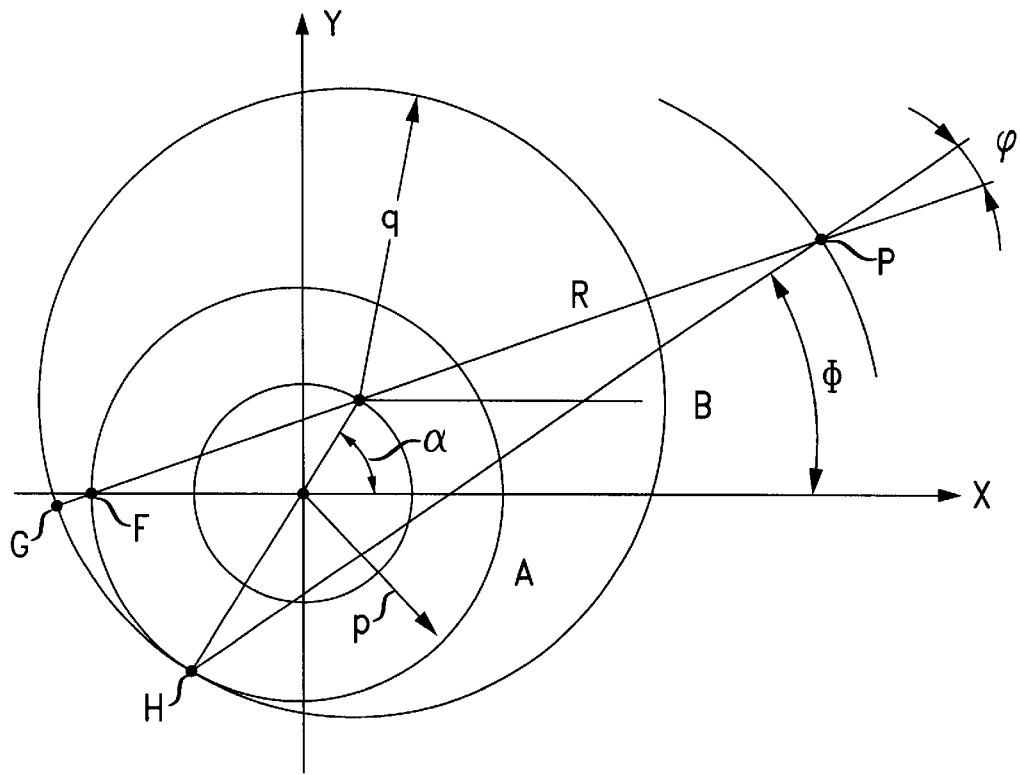
FIG. 2A illustrates the geometry from which a peritrochoid is generated.
Figure 2B:
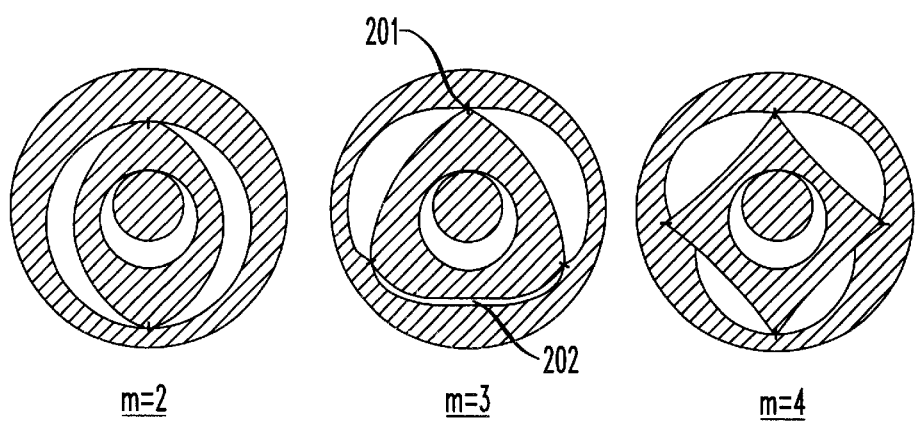
FIG. 2B illustrates the profiles of three peritrochoids wherein m=2, 3 or 4 as shown.

Referring now to FIG. 2A, illustrated is the geometry from which a peritrochoid is generated. A peritrochoid is defined as the locus of a tip point P of an arm fixed on a revolving circle B of radius q when it rolls along the periphery of a base circle A of radius p as inscribed. The curve so generated forms the basis for the profile of the inner surface of the engine housing 110. FIG. 2B illustrates the profiles of three peritrochoids wherein m=2, 3 or 4; wherein m is the number of points of the rotor that contact the inner surface of the engine housing, as shown. Note especially cusps 201, 202 of the peritrochoid.

Referring now back to FIGS. 1A through 1D as required, with continuing reference to FIG. 2B, note that the engine housing 110 of the present invention has a modified peritrochoidal cross section normal the central axis 111. That is, the peritrochoidal cross section generated with m=3 as seen in FIG. 2B is modified for the present invention so that at cusps 201, 202, right and left halves 112a, 112b, respectively, of the inner surface 112 are effectively separated and first and second curved sections 112c, 112d, respectively, that conform to an outer surface 125 of the first rotor 120, are inserted therebetween. Thus, the outer surface 125 of the first rotor 120 conforms to and seals against the two curved sections 112c, 112d aided by seals 128 located in the engine housing 110.

Figure 3B:
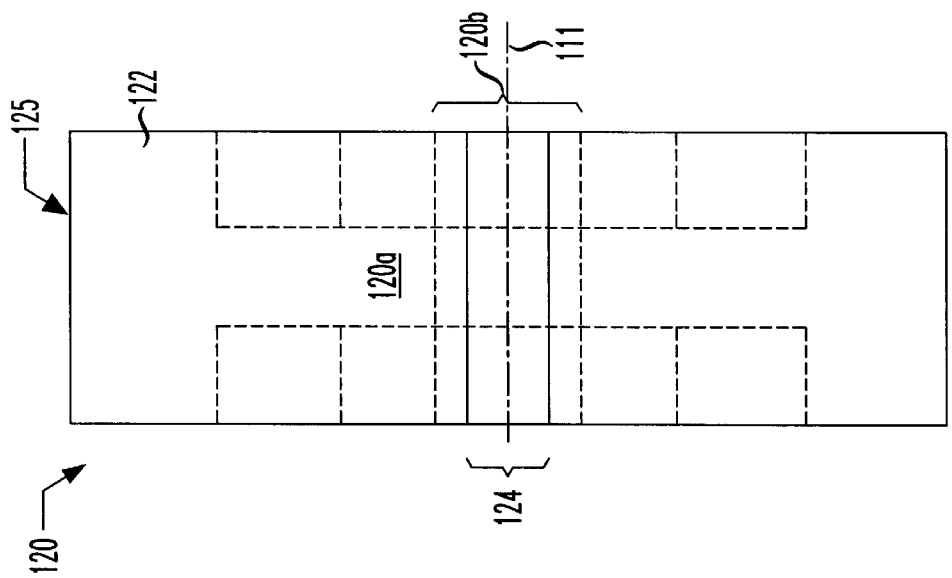
FIG. 3B illustrates an edge view of the rotor of FIGS. 1A through 1D.
Figure 3A:
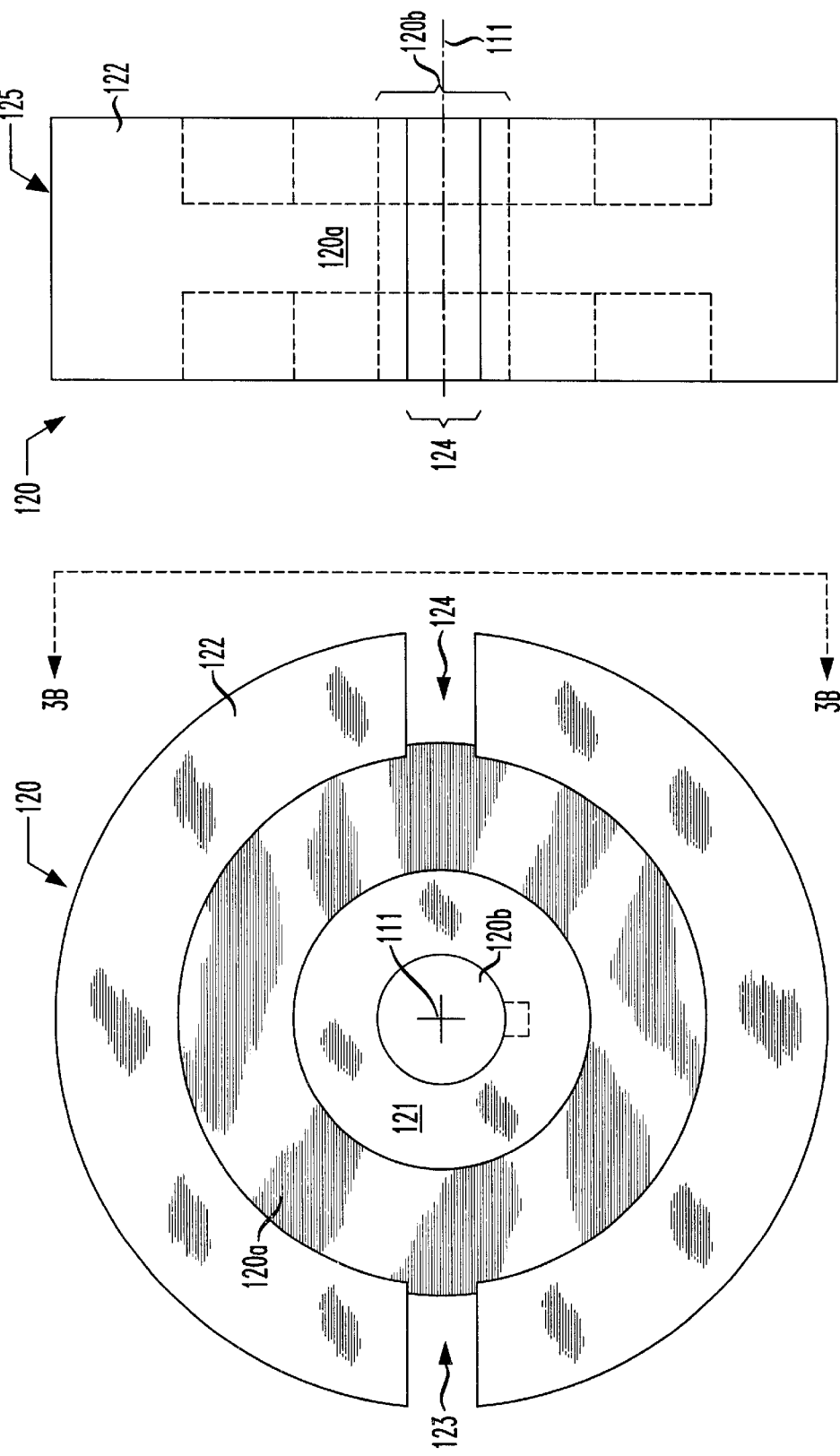
FIG. 3A illustrates an elevation view of the rotor of FIGS. 1A through 1D.

Referring now to FIGS. 3A and 3B with continuing reference to FIGS. 1A through 1D, illustrated are an elevation view (FIG. 3A) and an edge view (FIG. 3B) of the rotor 120 of FIGS. 1A through 1D. The rotor 120 comprises a rotor web 120a, a rotor aperture 120b, an inner hub 121, an outer flywheel 122, and first and second radial apertures 123, 124, respectively. The first and second radial apertures 123, 124 are cut radially through the outer flywheel 122. The first rotor 120 and drive shaft 130 have a common central axis 111 (normal to FIGS. 1A and 1C) that is also a common rotational axis 111. The inner hub 121 is fixedly coupled to the drive shaft 130 with a woodruff key 133 so that the drive shaft 130 and rotor 120 rotate counterclockwise (FIG. 1A) as indicated at arrow 129 with respect to the rotational axis 111. Furthermore, the first rotor 120 is symmetrical about the rotational axis 111. The first rotor 120 and drive shaft 130 may comprise steel for best inertial performance from the outer flywheel 122 as well as resistance to the temperatures and pressures generated within the engine 100.

Referring now to FIGS. 4A and 4B, illustrated are an end view (FIG. 4A) and a side view (FIG. 4B) of the first impeller 151 of FIGS. 1A through 1D. The first impeller 151 comprises an impeller body 450 having anterior and posterior faces 451, 452, respectively; first and second ends 453, 454, respectively; a rotor web notch 455; an outer roller bearing 456; and first and second inner roller bearings 457, 458, respectively. The impeller body 450 further comprises: (a) a plurality of longitudinal lubrication ports 459 from the first end 453 through to the second end 454; (b) a plurality of radial lubrication ports 460 from the outer roller bearing 456 radially through to the first or second inner roller bearings 457, 458; and (c) a plurality of transverse lubrication ports 461 from the anterior face 451 through to the posterior face 452. The lubrication ports 459, 460, 461 are supplied with lubricant, i.e., engine oil, through input ports 462 and interconnections 463 of the longitudinal, radial, and transverse lubrication ports 459, 460, 461. The details of how engine oil under pressure is provided to the lubrication ports 459, 460, 461 will be explained below. The first impeller 151 may further comprise end seals 464 along the first and second ends 453, 454. One who is skilled in the art will readily configure such seals. The second impeller 152 is identical to and functions in a similar manner to the first impeller 151.

Referring now simultaneously to FIGS. 3A, 3B, 4A and 4B with continuing reference to FIG. 1A. One who is skilled in the art will recognize that the rotor web notch 455 and the first radial aperture 123 cooperate to enable the first impeller 151 to slide radially in and out of the first radial aperture 123 while being constrained by the inner surface 112 of the first cavity 113. The lubrication ports 459, 460, 461 enable lubricating oil to reach all surfaces of the first impeller 151 and inner surfaces of the first radial aperture 123. Lubricating oil is also made available to the outer roller bearing 456, the first and second inner roller bearings 457, 458 and the inner surface 112 through the radial lubrication ports 460.

Figure 5A:
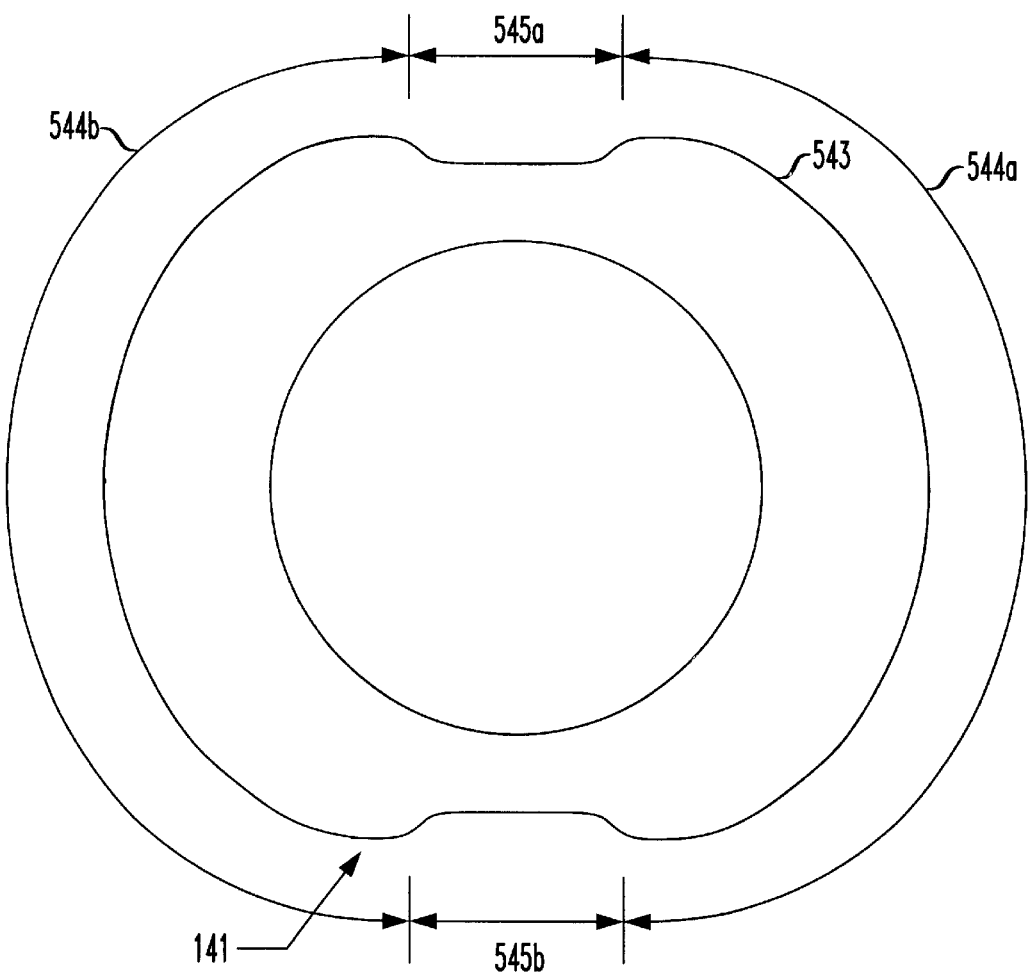
FIG. 5A illustrates an elevation view of the first compression cam of FIG. 1A.
Figure 5B:
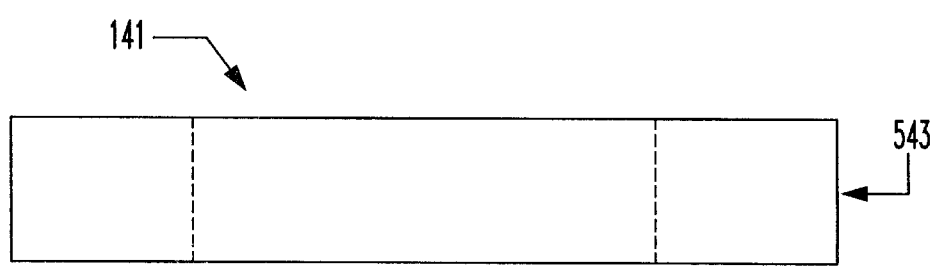
FIG. 5B illustrates an edge view of the first compression cam of FIG. 1A.

Referring now to FIGS. 5A and 5B with continuing reference to FIGS. 1A through 1D, illustrated are an elevation view (FIG. 5A) and an edge view (FIG. 5B) of the first compression cam 141 of FIG. 1A. The first compression cam 141 has an outer surface 543 thereabout and is held in a fixed relationship to the engine housing 110 by attachment to the front engine cover 101. In a preferred embodiment, the outer surface 543 comprises first and second working surface portions 544a, 544b and first and second dead surface portions 545a, 545b. The first and second working surface portions 544a, 544b correspond to first and second portions 112a, 112b, respectively, of the inner surface 112.

As the rotor 120 rotates (counterclockwise in FIG. 1A, clockwise in FIG. 1C), the first and second impellers 151, 152 are forced by the first and second working surface portions 544a, 544b into contact with the first and second portions 112a, 112b, respectively, thereby maintaining a seal against the inner surface 112. The first and second dead surface portions 545a, 545b generally follow the contour of the first and second portions 112c, 112d of the modified peritrochoidal profile 112. However, the first and second dead surface portions 545a, 545b are configured so that as either of the first or second impellers 151, 152 pass these portions, the impellers 151, 152 are not forced into contact with the first and second curved sections 112c, 112d, but slide inwardly or outwardly within the first and second radial apertures 123, 124, respectively. The first and second curved sections 112c, 112d may also be termed inner surface portions 112c, 112d. Because the distance between dead surface portions 545a, 545b and corresponding first and second curved sections 112c, 112d, respectively, is greater than a length l of the impellers 151, 152, the impellers 151, 152 will slide to a low point in each portion 545a, 112d under the influence of gravity or centrifugal force, thereby withdrawing from sealing against the first and second curved sections 112c, 112d. The second impeller 152 is located within and slidably coupled to the second radial aperture 124. Likewise, the second impeller 152 rides upon the outer surface 543 and slidably engages the inner surface 112 in regions 112a and 112b.

Figure 6A:
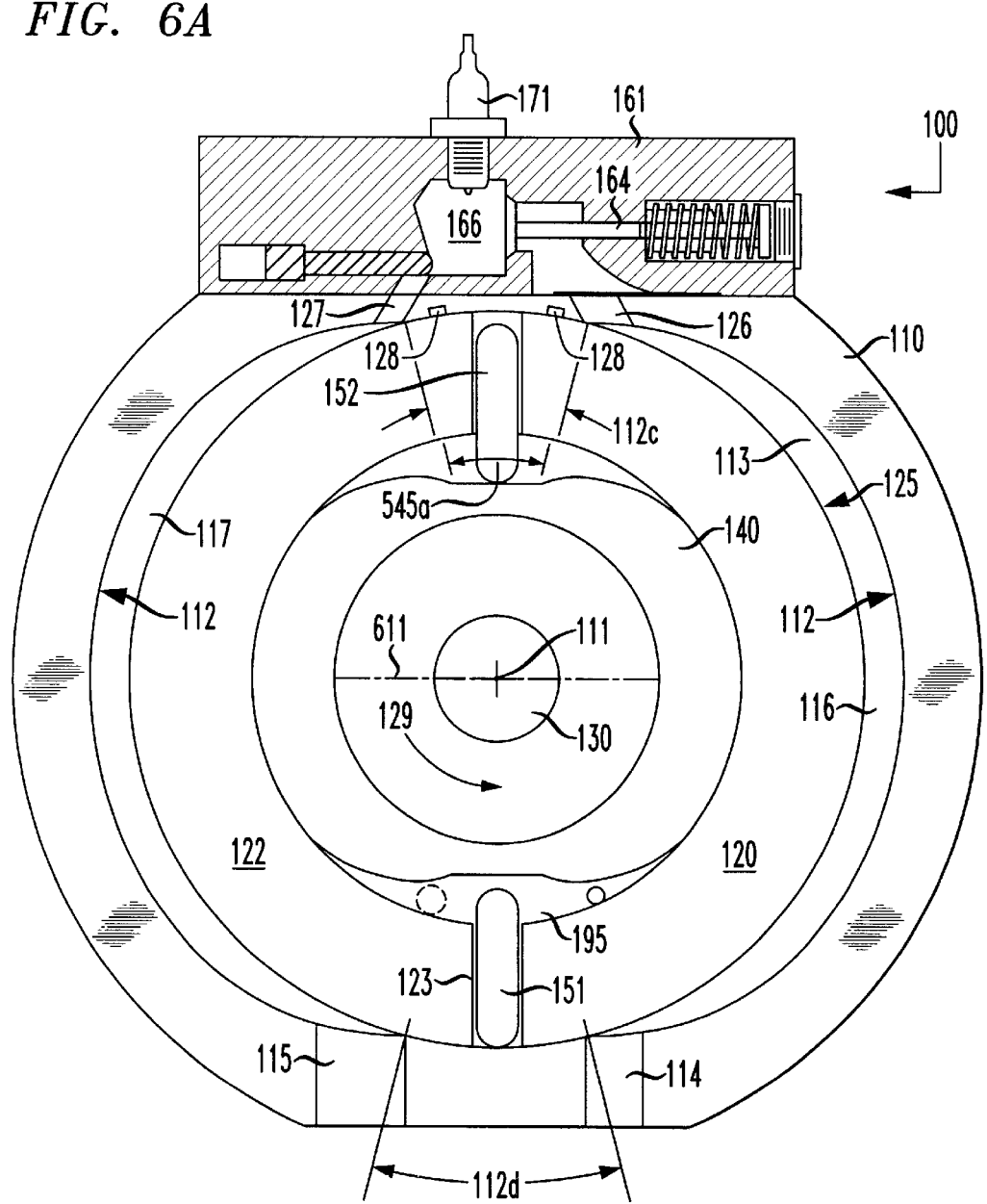
FIG. 6A illustrates a front sectional elevation view of the engine of FIGS. 1A through 1D with the rotor at an arbitrary start position.

The engine cycle will now be discussed. Referring now to FIGS. 6A through 6J, illustrated are progressive, front or rear elevation, sectional views of the internal combustion engine of FIGS. 1A through 1D during a combustion cycle. For the sake of this discussion, the rotor 120 is assumed to be at a start position as shown in FIG. 6A. That is, the rotor 120 is located with the second impeller 152 at an arbitrary rotational position of 0° (top center) and the first impeller 151 at a rotational position of 180° (bottom center).

To start the engine 100, the drive shaft 130 and rotor 120 may be initially rotated by an electrically-driven starter (not shown) that couples to the drive shaft 130 by a Bendix drive, or similar device. The coupling of the starter to the drive shaft 130 may be by engaging a geared auxiliary flywheel (not shown) that is coupled to the drive shaft 130. One who is skilled in the art is familiar with the employment of electrical starters to rotate a geared flywheel and a crankshaft of a conventional internal combustion engine for starting an engine. Of course, other starting methods may also be used. For example, with a twin-chamber engine, as will be discussed with respect to FIGS. 7A and 7B below, at least one impeller will be located at about the 90° counterclockwise position. Therefore, compressed air captured during a previous engine run may be injected into the preignition chamber 163, overcoming the poppet 164 and forcing the rotor 120 to induce a counterclockwise angular momentum at a rate permitting fuel and ignition to be applied to start the engine 100.

In FIG. 6A, the first impeller 151 is slidably extended within the first radial aperture 123 so that the first impeller 151 rides upon the inner surface 112d. In this position, engine lubrication in the form of a lubricating oil is present in an oil sump 195 between the compression cam 140 and the flywheel 122. A preferred level of lubrication is shown at lubrication level 611, that is, approximately at the rotational axis 111 halfway up the drive shaft 130.

In this position, ambient air enters the compression cavity 116 through air inlet aperture 114. Alternatively, for higher performance, air at a higher than ambient pressure may be forced through the air inlet aperture 114 into the compression cavity 116 by a supercharger (not shown). The second impeller 152 is slidably retracted within the second radial aperture 124 so that the second impeller 152 rides upon the first dead surface portion 545a. This assures that the second impeller 152 is retracted from, and not forced against, corresponding inner surface portion 112c. Instead, the outer surface 125 of the rotor 120 cooperates with the seals 128 thereby continually sealing against the inner surface portion 112c as the rotor 120 rotates.

Figure 6B:
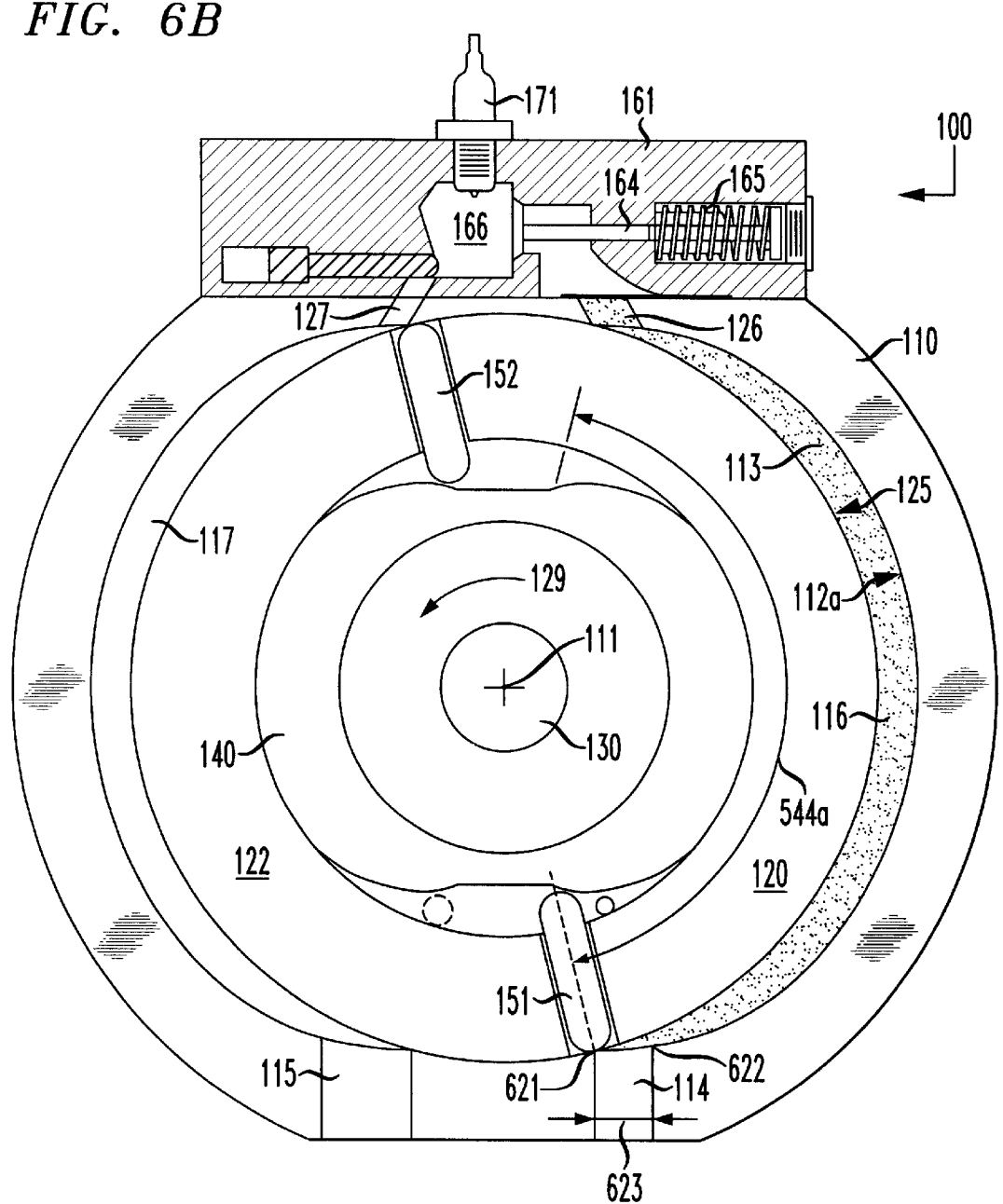
FIG. 6B illustrates a front sectional elevation view of the engine of FIGS. 1A through 1D with the rotor advanced in a counterclockwise direction about 15°.

Referring now to FIG. 6B, the rotor 120 has advanced in a counterclockwise direction about 150 so that the first impeller 151 is forced by an initial portion of surface 544a against a starting point 621 of the inner surface portion 112a. Once the rotor 120 rotates to a second point 622, the air allowed into the compression cavity 116 during the immediately prior portion 623 of the rotor 120 rotation is trapped in the compression cavity 116.

Figure 6C:
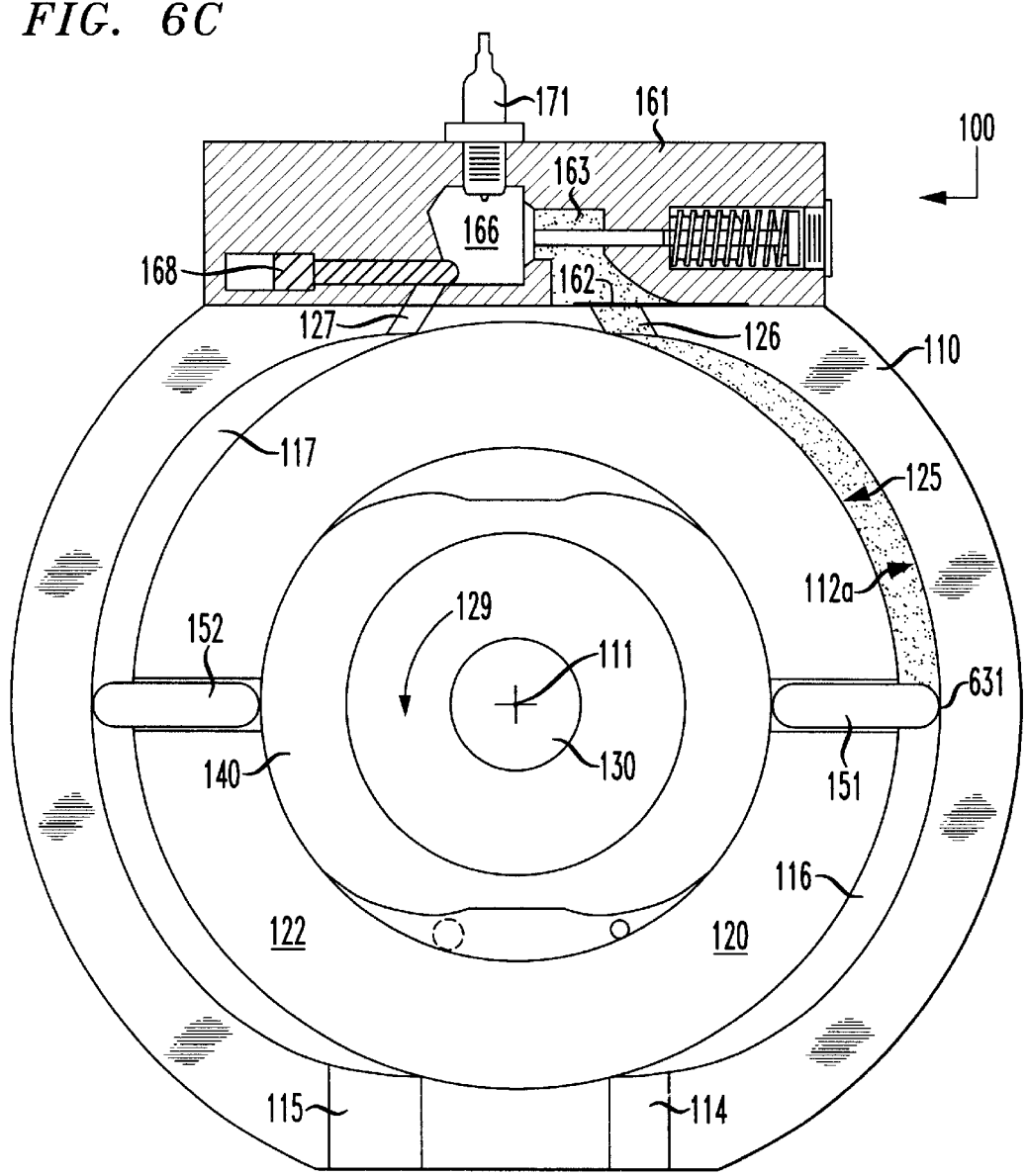
FIG. 6C illustrates a front sectional elevation view of the engine of FIGS. 1A through 1D with the rotor advanced about 90° with the first impeller at a point approximately one-half way through a compression stroke.

Referring now to FIG. 6C, illustrated is the rotor 120 rotated about 90° with the first impeller 151 at a point 631 approximately one-half way through a compression stroke. As the rotor 120 continues to rotate counterclockwise, the compression cam outer surface 544a causes the first impeller 151 to seal against the inner surface portion 112a, forcing the air, as pressure builds, through the compressed air inlet port 126, past the reed valve 162 and into the pre-ignition chamber 163. The reed valve 162 acts as a one-way valve preventing pressure trapped within the pre-ignition chamber 163 from forcing against the compression chamber 116 contents.

Figure 6D:
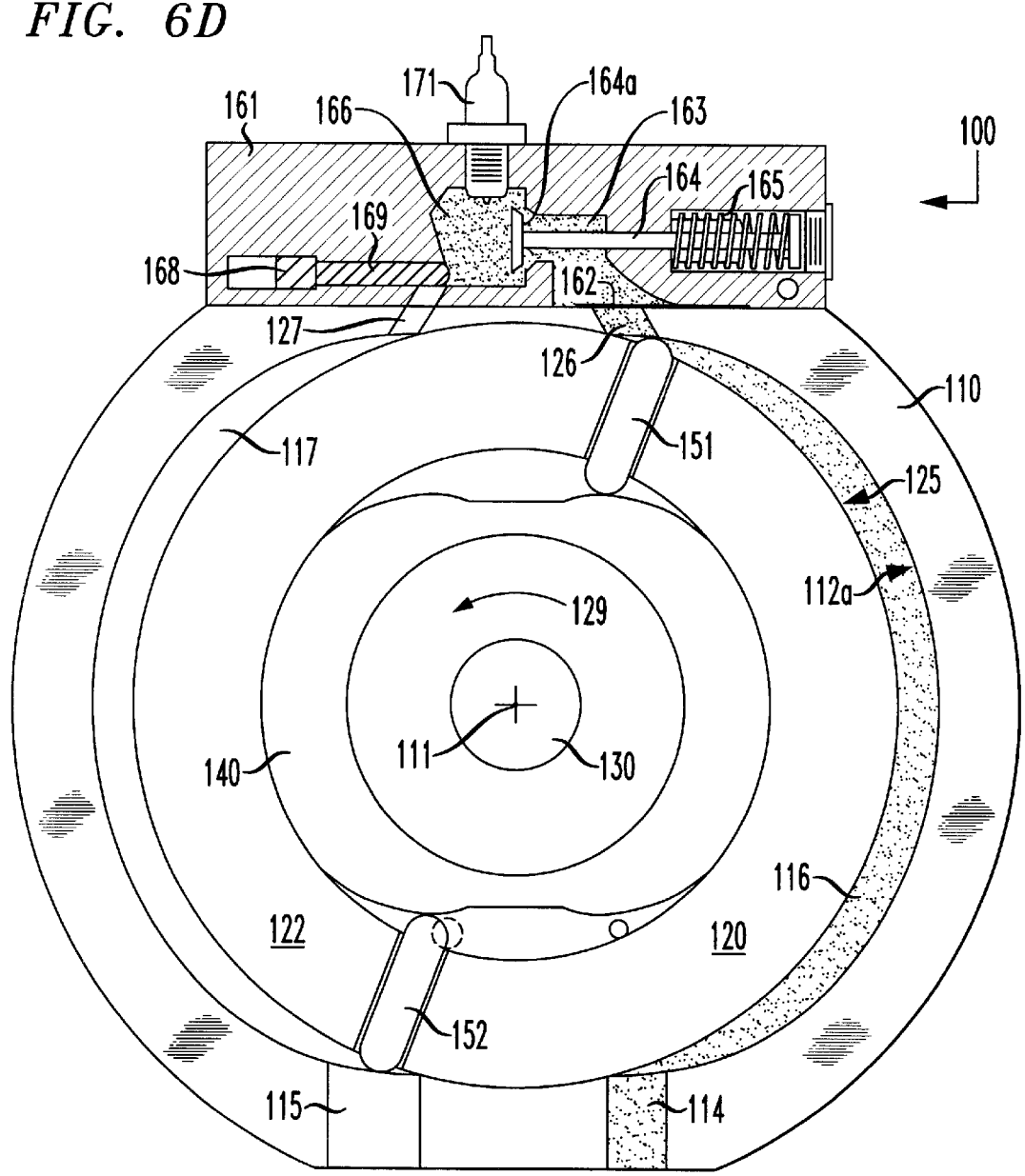
FIG. 6D illustrates a front sectional elevation view of the engine of FIGS. 1A through 1D with the rotor advanced to about 160° with the first impeller approaching the compressed air inlet port.
Figure 6E:
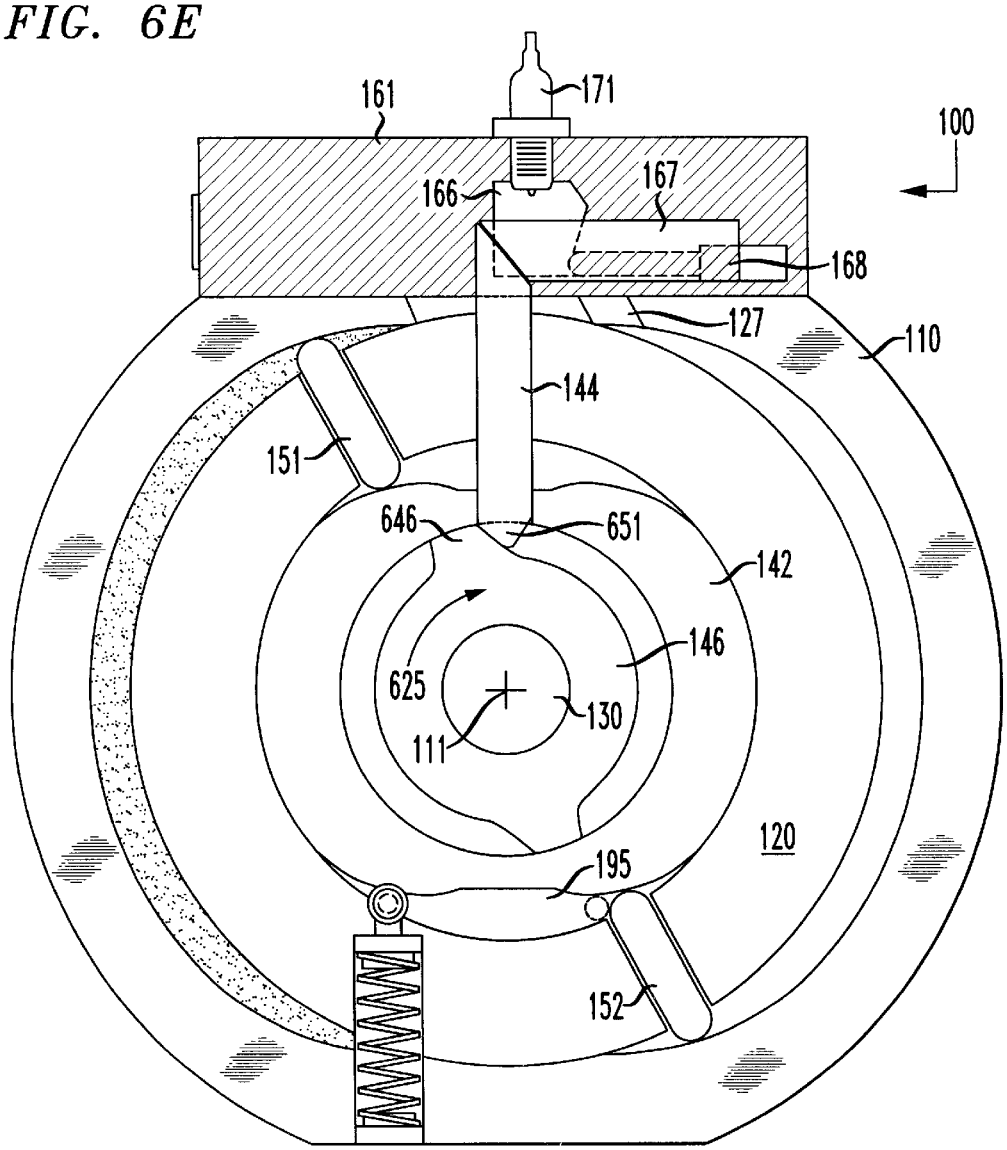
FIG. 6E illustrates a rear sectional elevation view of the engine of FIGS. 1A through 1D with the rotor advanced to about 160° or the same position as in FIG. 6D.

Referring now to FIGS. 6D and 6E, illustrated are front (FIG. 6D) and rear (FIG. 6E) elevations of the present invention with the rotor 120 advanced to the same position, i.e., about 1600, in a counterclockwise (FIG. 6D) (clockwise in FIG. 6E) direction so that the first impeller 151 is approaching the compressed air inlet port 126. At this point, the coil spring 165 of poppet 164 is overcome by air pressure created by the rotor 120 against a back 164a of the poppet 164. Computations of the available volumes of the compression cavity 116 versus the pre-ignition chamber 163 and ignition chamber 166 indicate that a compression ratio of about 10:1 can be achieved with the present invention. Therefore, a pressure of about 147 psia can be developed. The power stroke valve 169 is closed at this time by virtue of pressure from a lobe 646 of the combustion cam 146 pushing against the first push bar 144, the second push bar 167, and the pivot bar 168, in turn, thereby sealing the ignition chamber 166. With the poppet 164 open and the power stroke valve 169 closed, pressure equalizes between the ignition chamber 166 and the pre-ignition chamber 163. When the pressures on both sides of the poppet 164 are equal, the spring 165 resumes control and the poppet 164 closes, trapping compressed air in the ignition chamber 166.

Figure 6F:
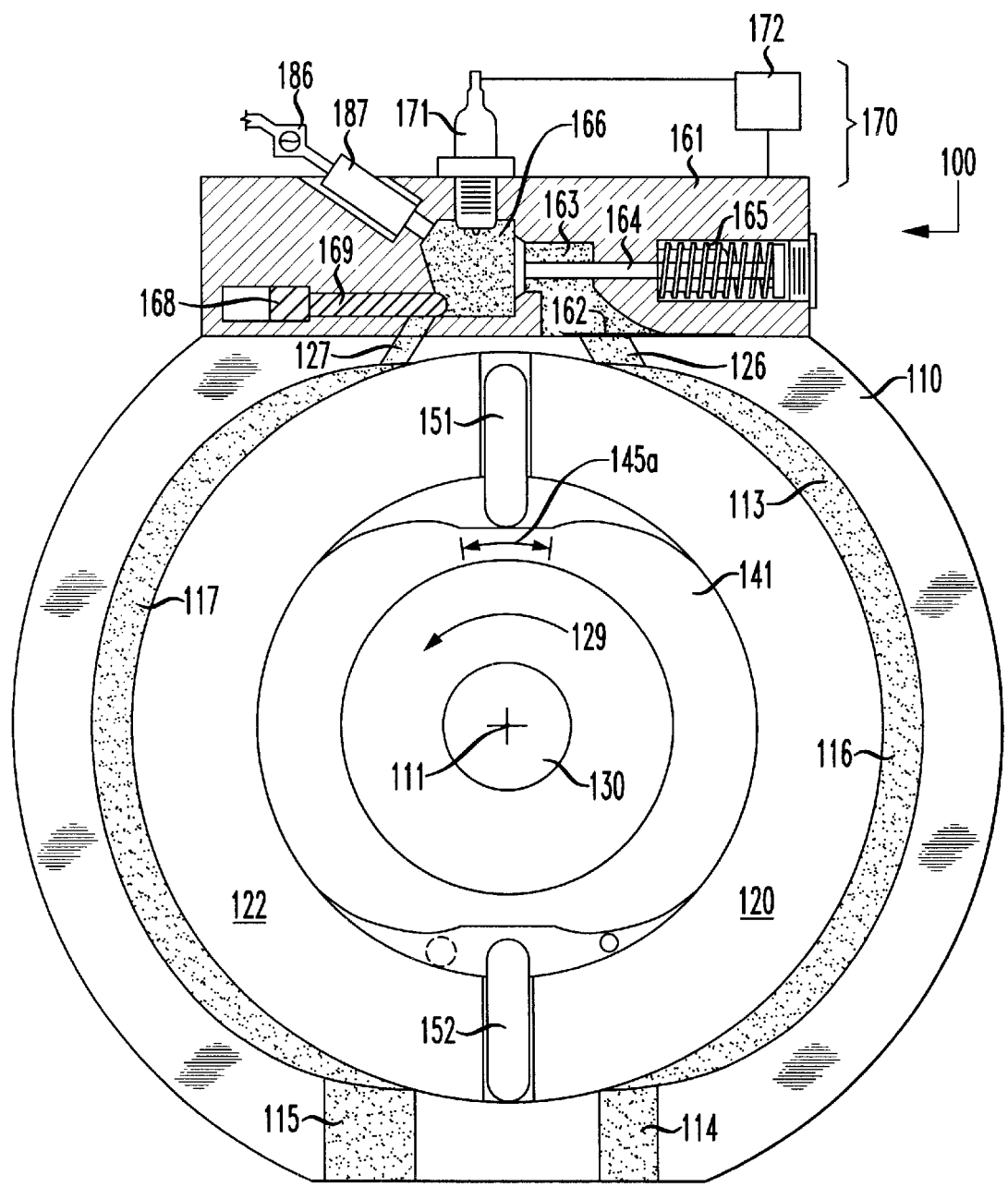
FIG. 6F illustrates a front sectional elevation view of the engine of FIGS. 1A through 1D with the rotor advanced to about 180° so that the first impeller is located in the dead surface portion.
Figure 6G:
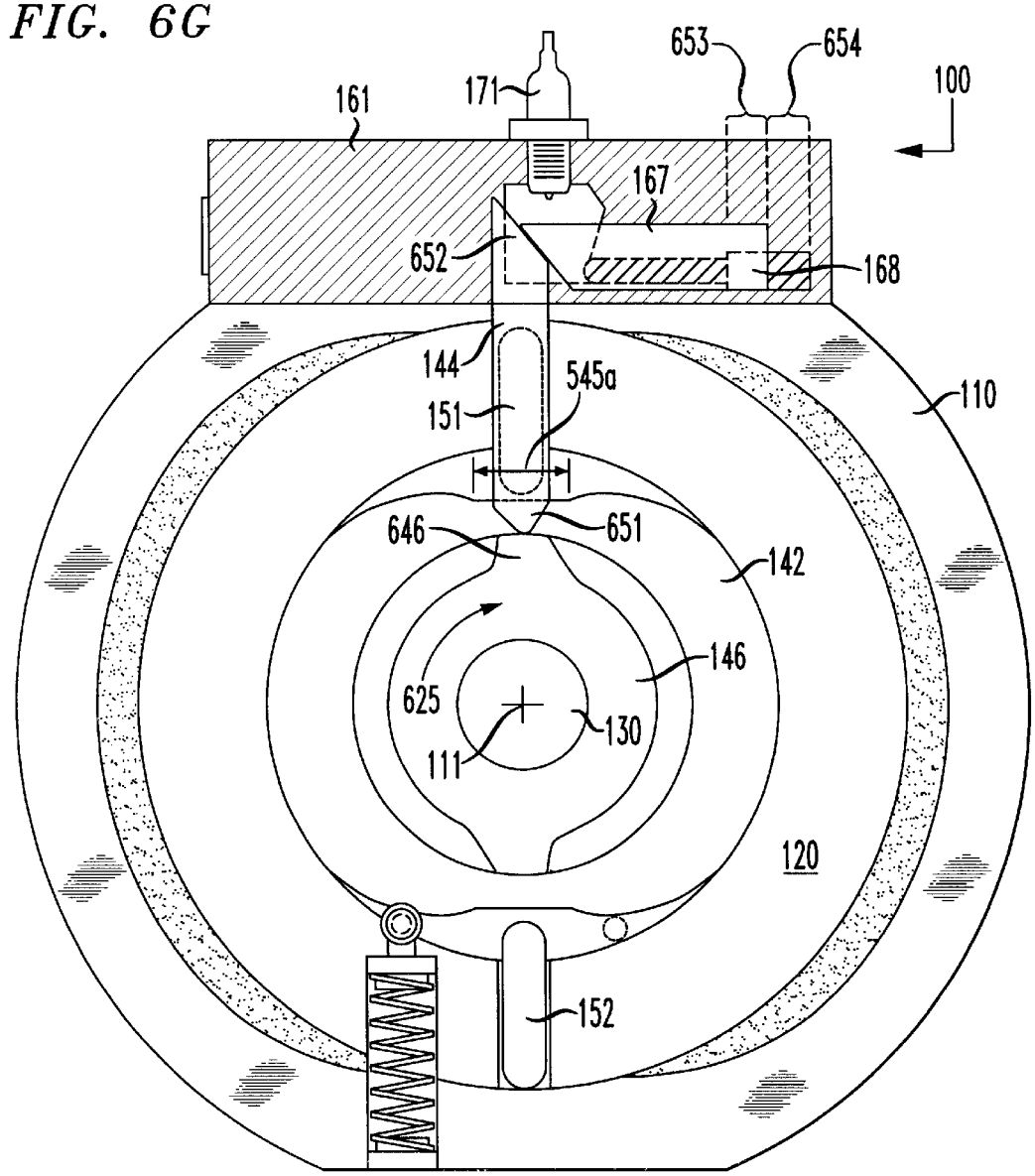
FIG. 6G illustrates a rear sectional elevation view of the engine of FIGS. 1A through 1D with the rotor advanced to about 180° or the same position as in FIG. 6F.

Referring now to FIGS. 6F and 6G, the rotor 120 has advanced in a counterclockwise (FIG. 6F) (clockwise in FIG. 6G) direction 129 about 180° so that the first impeller 151 is located in the dead surface portion 545a. Here, the first end 651 of the first push bar 144 has ridden up on the first cam lobe 646, forcing a second end 652 vertically against the second push bar 167, causing the second push bar 167 to slide horizontally within the rear engine cover 102 (FIGS. 1B and 1D). An end 653 of the second push bar 167 pushes on a first end 654 of the pivot bar 168, causing the pivot bar 168 to force the power stroke valve 169 closed. Referring momentarily to FIG. 1D, it can be seen that a pivot pin 177 through the pivot bar 168 acts to control the operation of the power stroke valve 169.

The fuel injection pump 186 is coupled to the combustion cam 146 so as to time fuel injection into the ignition chamber 166 when the first impeller 151 is at approximately the position shown in FIG. 6F. With the power valve 169 and poppet 164 closed, the injected fuel mixes with the compressed air in the ignition chamber 166. The rotor 120 continues to rotate past top center under the influence of its own angular momentum. Following fuel injection, the ignition system 170 causes the spark plug 171 to create a spark in the ignition chamber 166, thereby igniting the fuel/air mixture and causing combustion gases to expand. Because the timing of the opening of the power stroke valve 169 is controlled by the position of the drive shaft 130, afterfire resulting in reverse rotation of the drive shaft 130 is effectively eliminated.

Figure 6H:
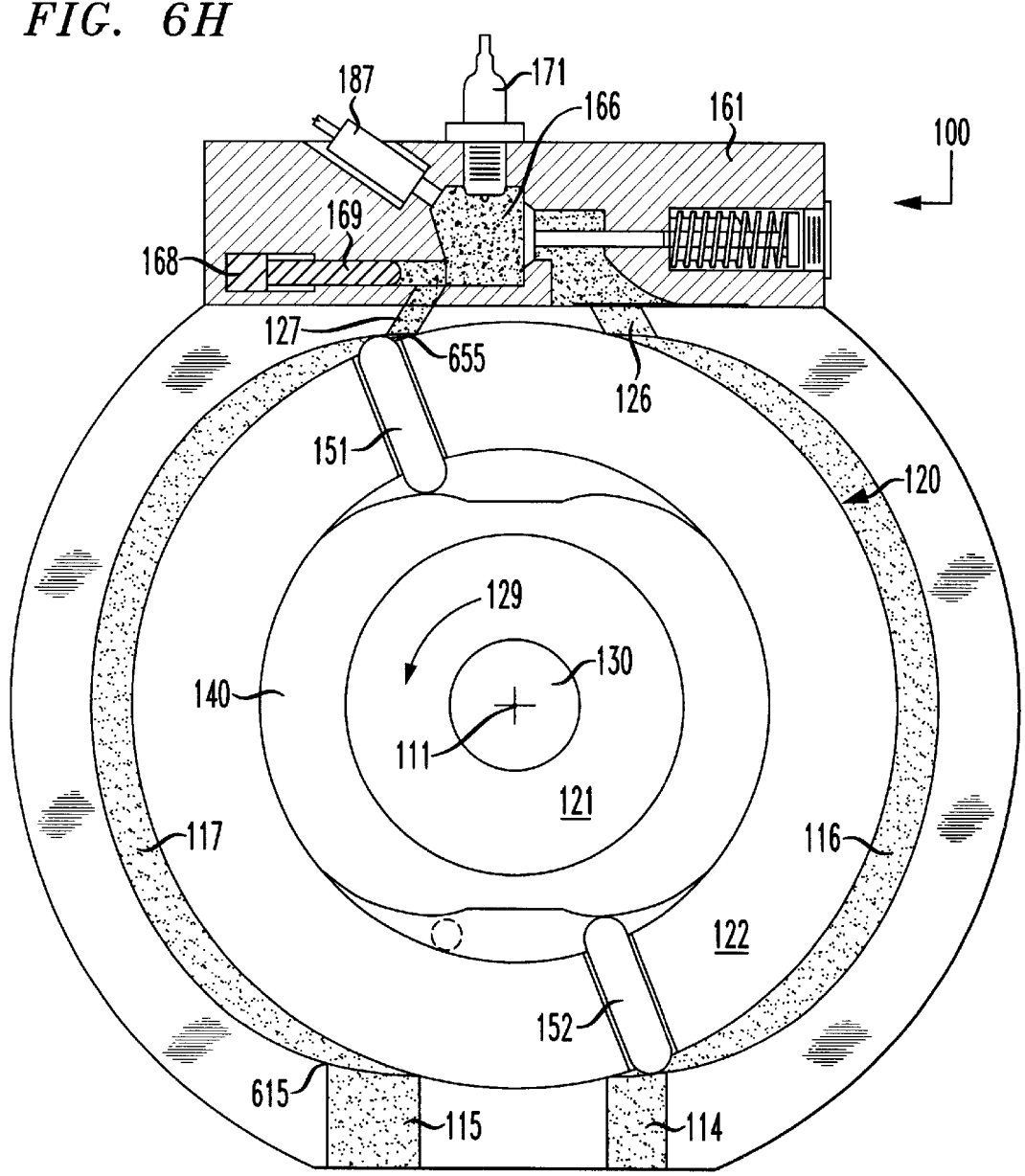
FIG. 6H illustrates a front sectional elevation view of the engine of FIGS. 1A through 1D with the rotor advanced about 210° so that the first impeller is located just past the exhaust gas port.
Figure 6I:
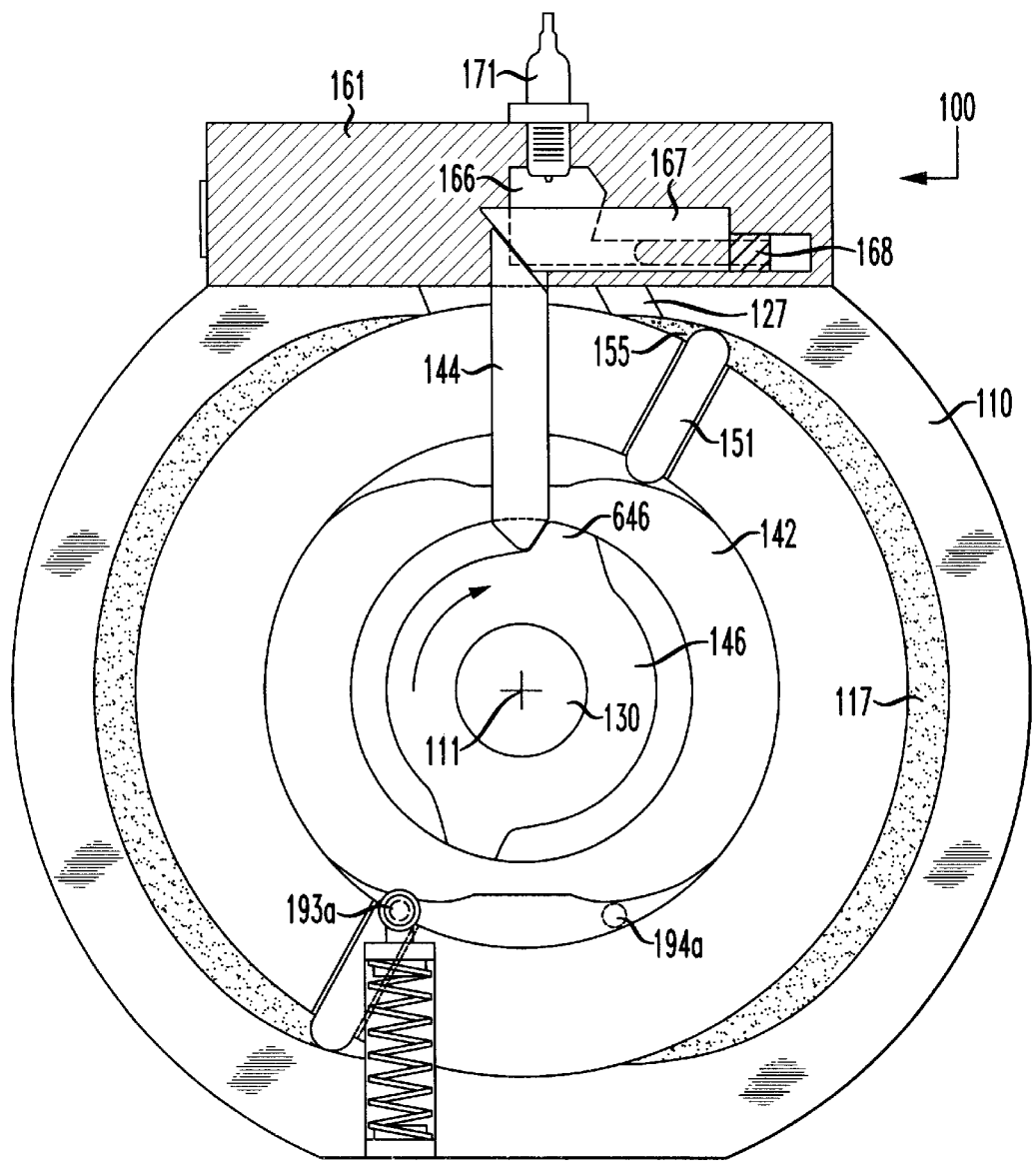
FIG. 6I illustrates a rear sectional elevation view of the engine of FIGS. 1A through 1D with the rotor advanced about 210° or the same position as in FIG. 6H.

Referring now to FIGS. 6H and 6I, the rotor 120 has advanced in a counterclockwise direction (FIG. 6H) about 210° so that the first impeller 151 is located just past the exhaust gas port 127. With the combustion cam 146 in this position, pressure from the lobe 646 is relaxed on the first push bar 144, the second push bar 167, and the pivot bar 168, in turn, allowing the power stroke valve 169 to open under pressure from the combustion gases in the ignition chamber 166. The combustion gases can then expand against a back side 655 of the first impeller 151, imparting a counterclockwise (FIG. 6H) rotation 129 to the rotor 120 and the drive shaft 130 in turn. As the gases expand in the exhaust cavity 117 behind the first impeller 151, further rotary motion is imparted to the rotor 120 until the first impeller 151 passes a leading edge 615 of the exhaust aperture 115. Note that the exhaust cavity 117 is of relatively modest size, approximating the compression cavity 116. Notably, this is in contrast to the Wankel engine that has an exhaust cavity that rapidly enlarges under the influence of a rotating arciform deltoid rotor. Therefore, the present invention does not suffer from the loss of gas pressure due to expansion within a rapidly enlarging cavity as is the case in the Wankel engine.

Figure 6J:
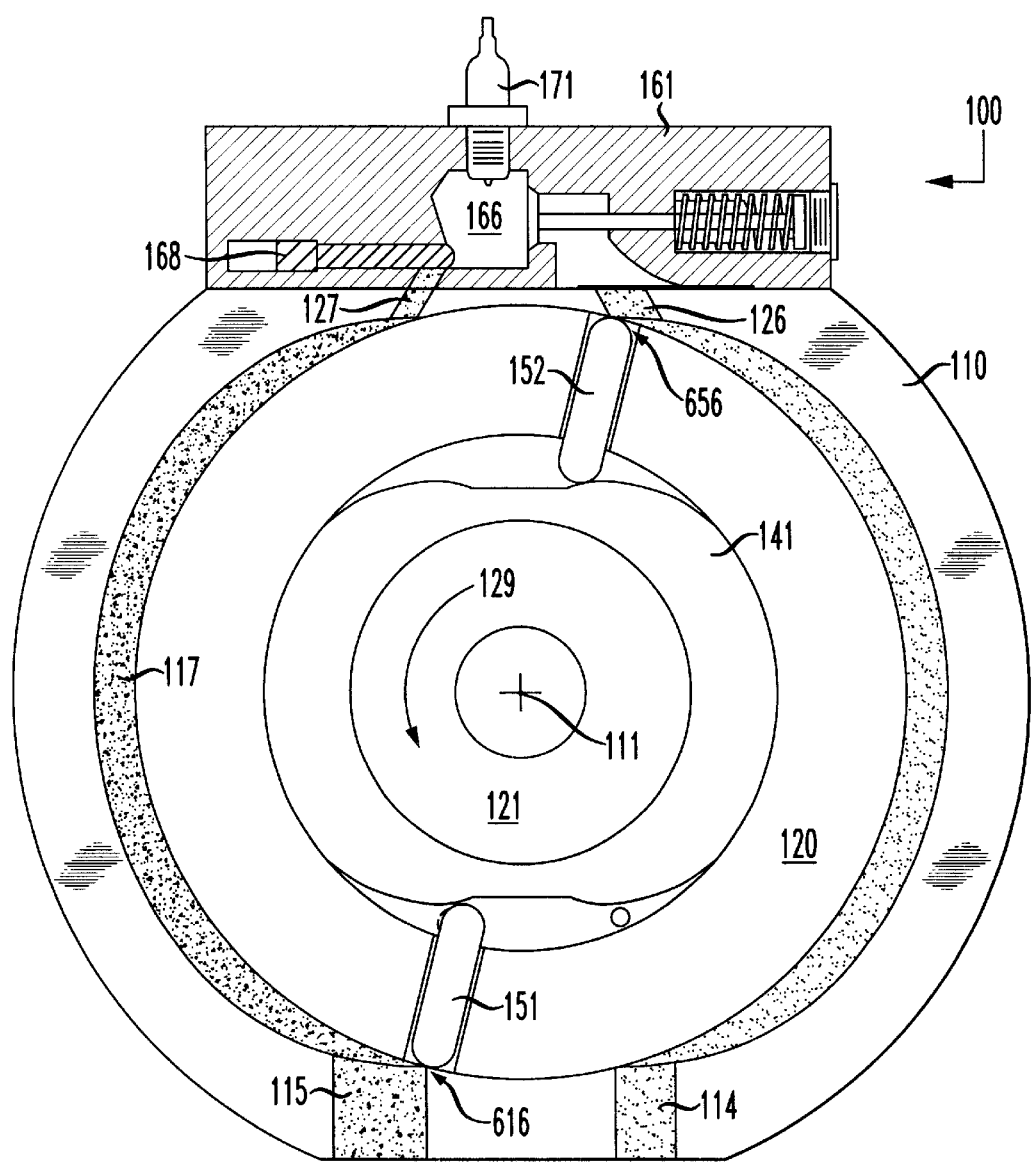
FIG. 6J illustrates a front sectional elevation view of the engine of FIGS. 1A through 1D with the rotor advanced in a counterclockwise direction about 345° so that the first impeller is located at a point just past the exhaust aperture.

Referring now to FIG. 6J, the rotor 120 has advanced in a counterclockwise direction about 345° so that the first impeller 151 is located at a point 616 just past the exhaust aperture 115. In this position, the combustion gases present in the exhaust cavity 117 behind the first impeller 151 flow to the atmosphere and the power stroke of the engine 100 is complete. With the first impeller 151 beyond the exhaust aperture 115, angular momentum of the flywheel 122 takes over to continue the rotary motion 129 until the next firing cycle, directed to a back side 656 of the second impeller 152, occurs. Thus in this design, a heavy flywheel, such as may be constructed of steel, will have a desirably large moment of inertia about the rotational axis 111 that, in turn, yields a high angular momentum while also being able to resist the pressures and high temperature environment of the exhaust cavity 117.

Note that while the first impeller 151 is moving from a location proximate the exhaust gas port 127 (FIG. 6H) to a location proximate the exhaust aperture 115 (FIG. 6J), the second impeller 152 is moving from a location proximate the air inlet aperture 114 to a location proximate the compressed air inlet port 126. This rotary motion of the rotor 120 and the second impeller 152 compresses a new volume of air for combustion on the next power stroke directed against the second impeller 152. Thus, one who is skilled in the art will readily see that an engine constructed according to the principles of the present invention will have an ignition event every 180° of the rotation of the drive shaft 130. This is in contrast to a conventional four-cycle reciprocating engine that has only one ignition event/power stroke for each 720° of crankshaft rotation.

Refer now to FIGS. 1C, 1D, 5A and 5B for a discussion of the engine lubrication system. As the rotor 120 rotates clockwise about the central axis 111 as in FIG. 1C, the first impeller 151 approaches the oil sump 195 at an angular velocity of about 600 rpm. As the first impeller 151 enters the oil sump 195, the impeller 151 departs from the surface 543 of the first and second combustion cams 141, 142. The rotary motion of the impeller 151 against the oil causes some oil to be forced past the impeller 151 in the gap between the impeller 151 and the first and second combustion cams 141, 142, but the oil is constrained and thereby forced under pressure past a leading surface 151a of the first impeller 151. This causes pressure to build in the oil sump 195 which is somewhat relieved by forcing oil through ports 119a, 119b, past the check balls 193, 194 and against pistons 198a, 198b. The springs 199a, 199b allow the pistons 198a, 198b to retract within the oil scavengers 191, 192, forming two oil reservoirs under pressure from the springs 199a, 199b. Additionally, oil under pressure is forced through input lubrication ports 462 (see FIGS. 4A and 4B) and into the lubrication ports 459, 460, 461 of the impellers 151, 152. Oil is then carried via the interconnections 463 to the longitudinal and transverse lubrication ports 459, 461 under pressure from the springs 199a, 199b. Thus, oil is provided to all surfaces of the impeller 151, as well as the inner surfaces of the first and second radial apertures 123, 124. Oil is further directed under pressure to first and second secondary lubrication apertures 193a, 194a in the front and rear engine covers 101,102 and carried to other locations within the engine 100 to lubricate vital moving parts.

Figure 7:
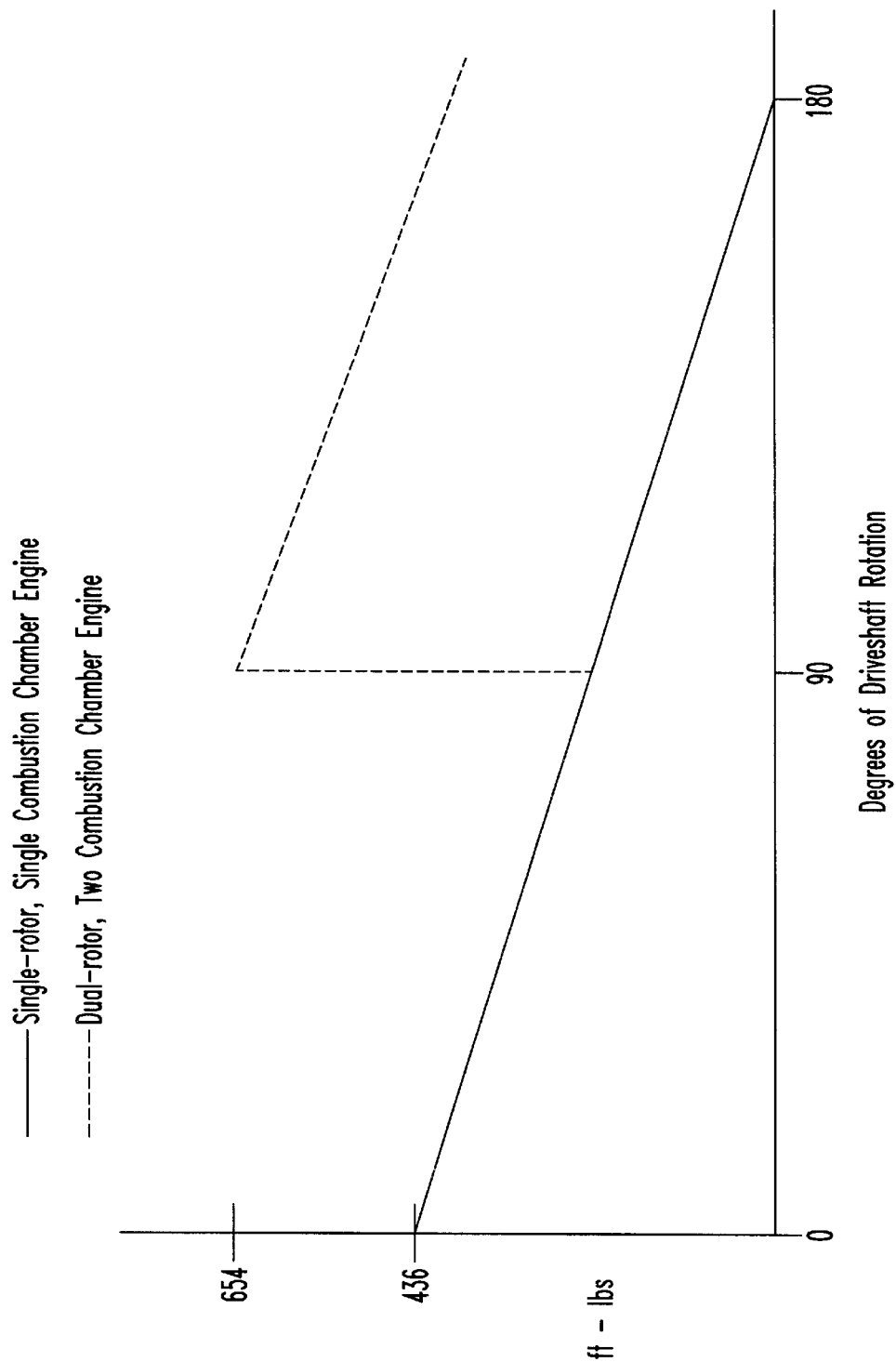
FIG. 7 illustrates a torque versus degree of drive shaft rotation for the rotary internal combustion engine of FIGS. 1A through 1D.

Referring now to FIG. 7, illustrated is a torque versus degree of drive shaft rotation for the single-rotor, single combustion chamber, rotary internal combustion engine 100. Note that with a single combustion chamber as described above, an estimated maximum 436 ft-lbs of torque should be developed by the engine 100 with a 52 lb, 9 inch diameter rotor having a 3 inch thickness at 500 rpm. The effect of adding a second combustion chamber and a second rotor is shown in dotted line. Such a dual rotor, two combustion chamber engine will now be described with reference to FIGS. 8A and 8B.

Figure 8A:
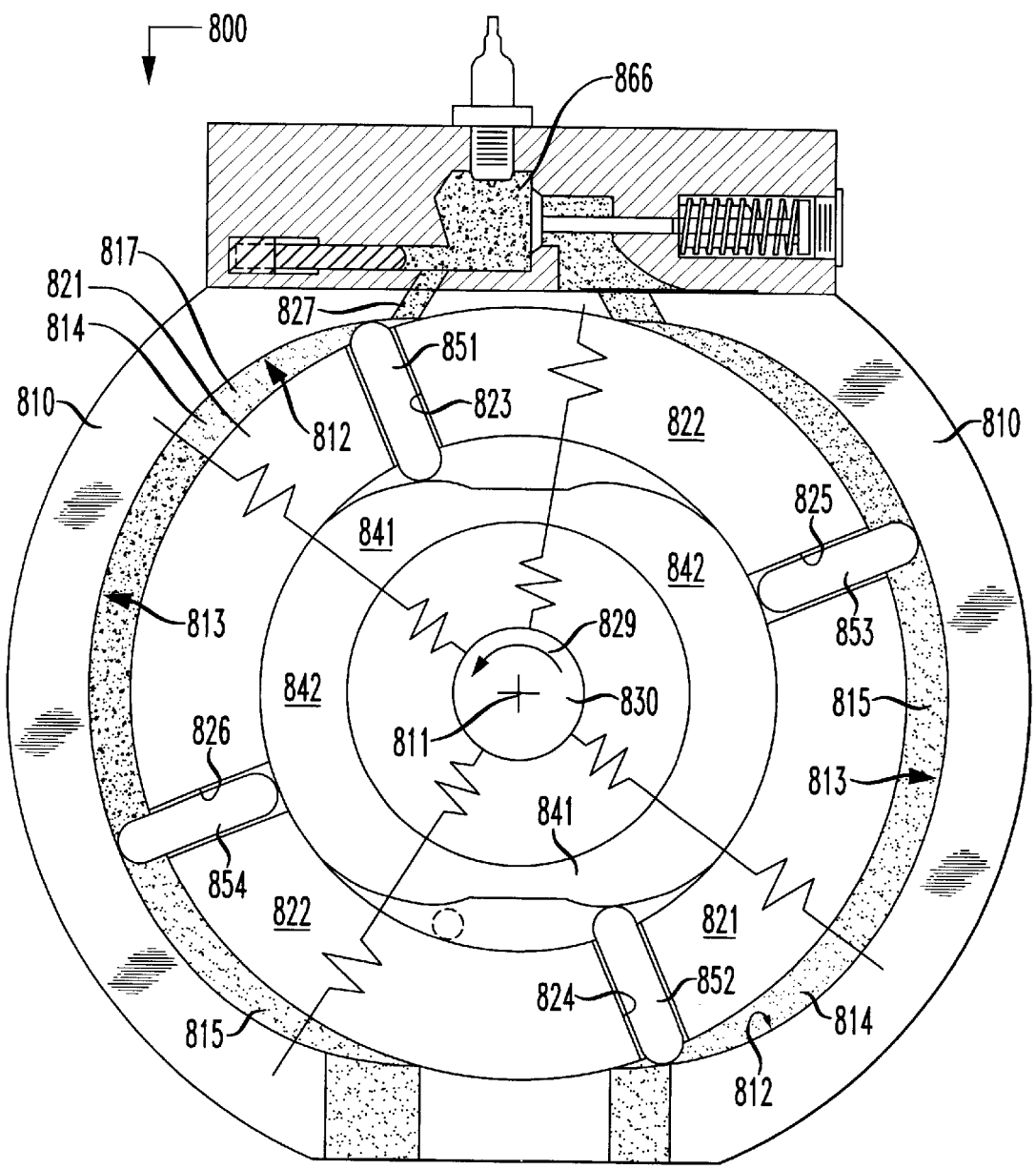
FIG. 8A illustrates a front elevation, partial sectional and partial cutaway view of the essential elements of a two combustion chamber, internal combustion engine constructed according to the principles of the present invention.

Referring now to FIG. 8A, illustrated is a front elevation, partial sectional and partial cutaway view of the essential elements of a two combustion chamber, internal combustion engine 800 constructed according to the principles of the present invention. The two combustion chamber, internal combustion engine 800 may also be referred to as a two-chamber engine 800. The two-chamber engine 800 comprises an engine housing 810; first and second rotors 821, 822; a drive shaft 830; first and second compression cams 841, 842; first and second combustion cams (not visible); first and second impellers 851, 852; third and fourth impellers 853, 854; and front and rear engine covers (not visible, but designated 881, 882). The engine housing 810 has a central axis 811 and first and second inner surfaces 812, 813 which present the same sectional shape, i.e., a modified peritrochoid. The engine housing 810 may comprise steel, aluminum, ceramic or other suitable structural material. The first and second rotors 821, 822 are journalled for rotation within the engine housing 810. The first inner surface 812 delimits a first cavity 814 in the engine housing 810 while the second inner surface 813 delimits a second cavity 815 in the engine housing 810. The first and second cavities 814, 815 may also be termed first and second chambers 814, 815. Each of the first and second chambers 814, 815 has associated with it the necessary individual fuel metering, and ignition systems analogous to the components of the single chamber internal combustion engine of FIGS. 1A–1D. The first and second chambers 814, 815 share a common cooling system analogous to the cooling system of the single chamber internal combustion engine. For the sake of brevity, the discussion below will focus primarily on the differences between the first and second chambers 814, 815.

The first and second impellers 851, 852 are installed in first and second apertures 823, 824 in the first rotor 821. The third and fourth impellers 853, 854 are likewise installed in third and fourth radial apertures 825, 826 in the second rotor 822. The position of the first impeller 851 is shown just counterclockwise from an exhaust gas port 827 of the first chamber 814 and is defined as a reference position for this discussion. The position of the third impeller 853 is readily seen to be about 90° clockwise from the reference position. The first and second rotors 821, 822 are rigidly coupled to the drive shaft 830 and rotate concurrently in a counterclockwise direction 829 about the central axis 811. One who is skilled in the art will recognize that the first impeller 851 has just passed a position for ignition of a fuel/air mixture in a first combustion chamber 866 that will exhaust through the exhaust gas port 827 into an exhaust cavity 817. Likewise, the third impeller 853 and the second rotor 822 are slightly more than half way through a compression cycle.

Figure 8B:
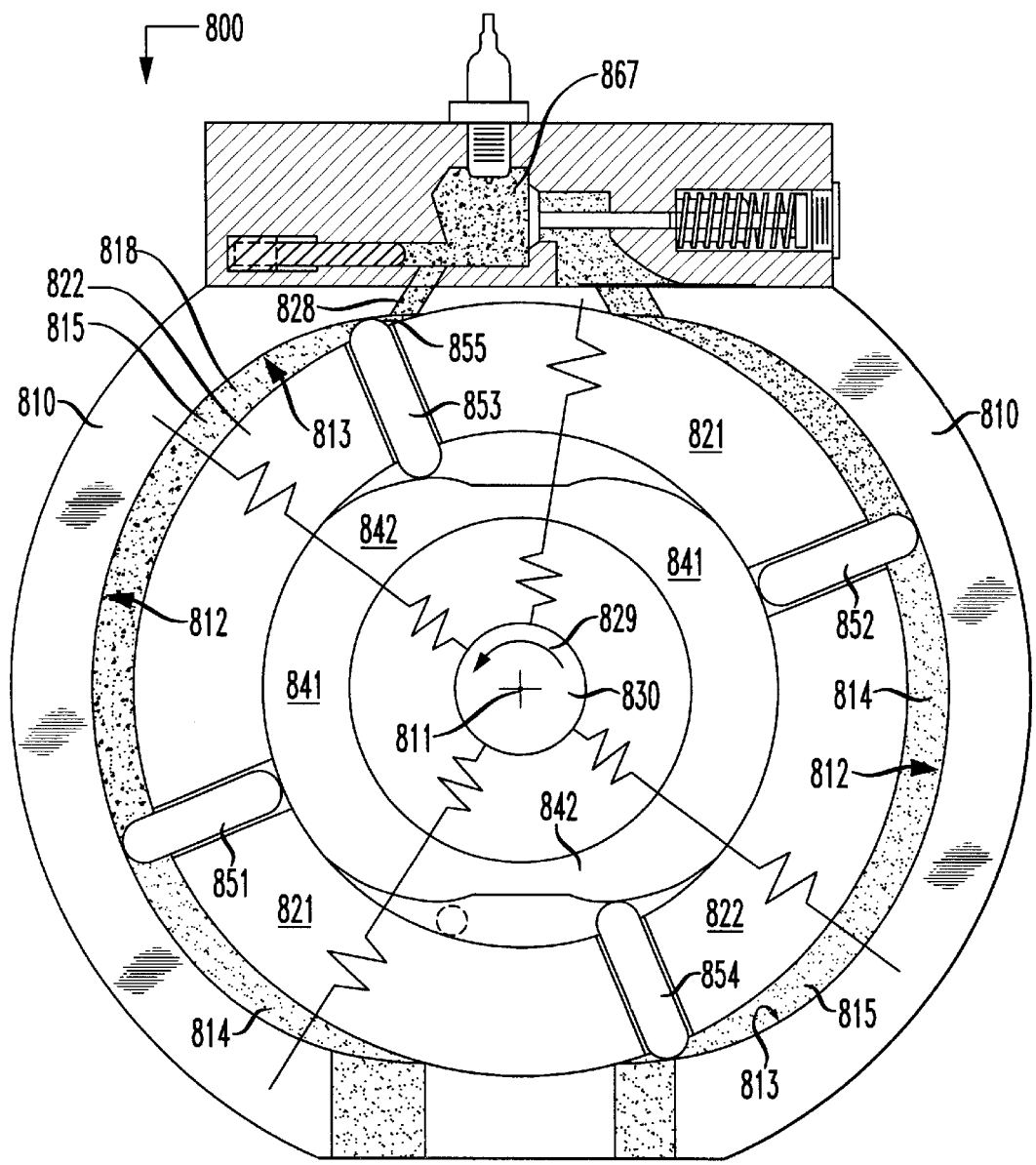
FIG. 8B illustrates a front elevation, partial sectional and partial cutaway view of the two-chamber internal combustion engine of FIG. 8A with the first and second rotors advanced to a firing position for the second chamber.

Referring now to FIG. 8B, illustrated is a front elevation, partial sectional and partial cutaway view of the two-chamber internal combustion engine 800 of FIG. 8A with the first and second rotors 821, 822 advanced to a firing position for the second chamber 815. In this illustration, ignition of the fuel/air mixture in a second combustion chamber 867, associated with the second chamber 815, has just occurred and the third impeller 853 and the second rotor 822 begin rotation under the influence of the exhaust gases. The expanding gases now impinge upon a rear face 855 of the third impeller 853 causing the second rotor 822 and other coupled components, i.e., the first rotor 821 and the drive shaft 830, to rotate counterclockwise 829 an equal number of degrees.

Thus, one who is skilled in the art will readily see that while the single-rotor, single combustion chamber engine 100 constructed according to the principles of the present invention described above has an ignition event every 180° of the rotation of the drive shaft 130, a single-rotor, dual combustion chamber engine 800 constructed according to the principles of the present invention will have an ignition event every 90° of rotation of the drive shaft 830. Of course, it is readily seen that with an ignition event every 90° of drive shaft rotation, the engine 800 will run even smoother and with fewer energy losses when compared to a conventional reciprocating engine design in which each cylinder fires only once for every 720° of crankshaft rotation. Additionally, one who is skilled in the art will recognize that a three chamber engine may be readily constructed with 60° between the location of a lead impeller in a first rotor and a corresponding lead impeller in a second rotor, with an additional 60° between the lead impeller of the second rotor and a lead impeller of a third rotor. Such an engine will have an ignition event and a power stroke every 60° of drive shaft rotation and should prove to be an extremely smooth running engine. Of course, one who is skilled in the art will recognize that additional chambers may be added as required with appropriate adjustments of the angle between impellers of adjacent rotors.

Figure 9F:
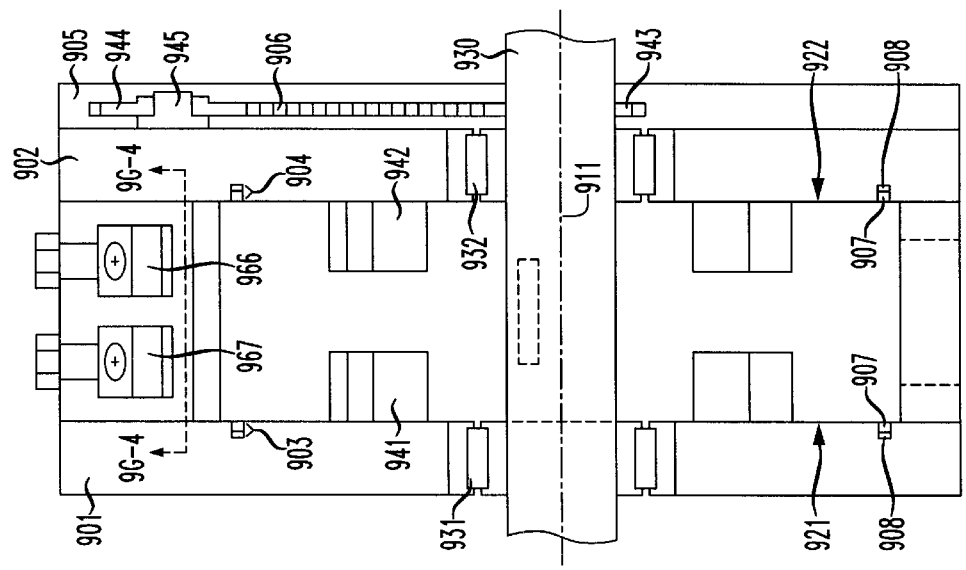
FIG. 9F illustrates a right side, partial sectional view of an alternative embodiment of the internal combustion engine of FIG. 9A as seen along plane 9B—9B.
Figure 9A:
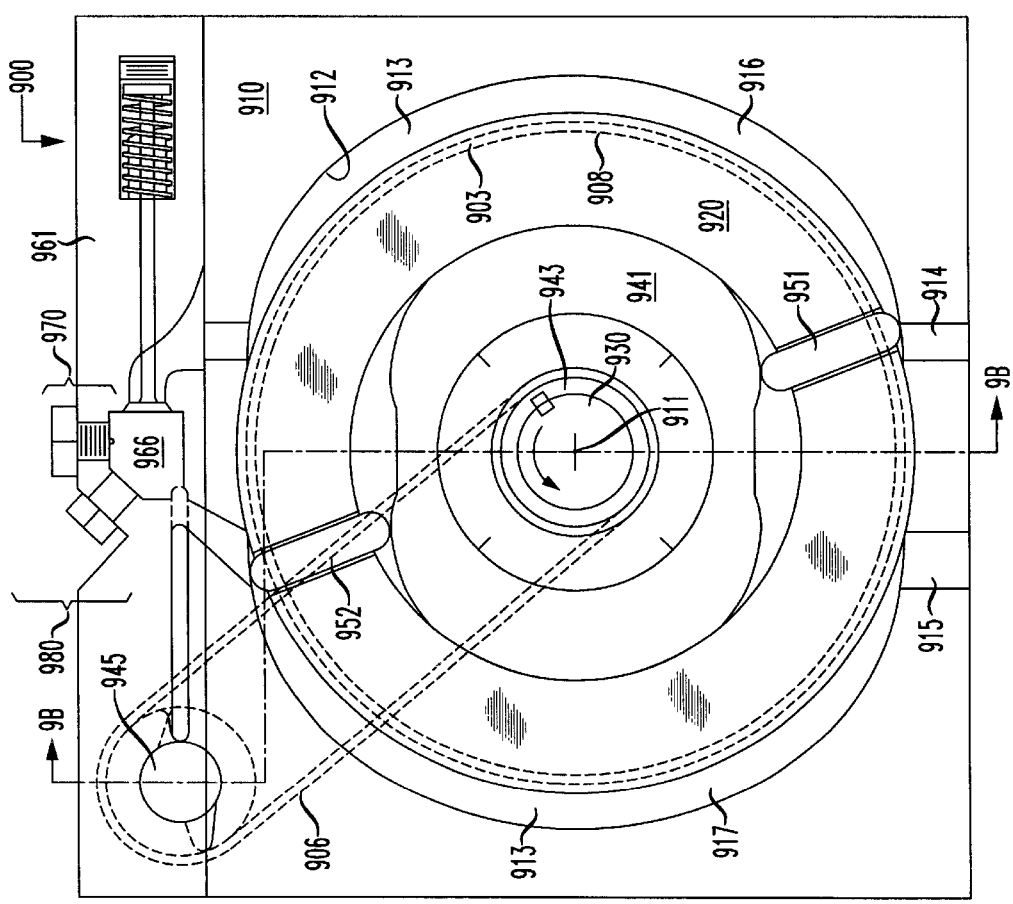
FIG. 9A illustrates a front elevation sectional view of an alternative embodiment of the internal combustion engine of FIGS. 1A through 1D.

Referring now to FIGS. 9A through 9F, illustrated are various views of the elements of an alternative embodiment of an internal combustion engine 900 employing a chain driven camshaft that operates a pair of power stroke valves. FIG. 9A illustrates the elements of the internal combustion engine 900 as seen along plane 9A–8A defined in FIG. 9B, that is with a front engine cover removed.

Refer now to FIGS. 9A through 9D. In a preferred embodiment, the internal combustion engine 900 comprises an engine housing 910; front and rear engine covers 901, 902; front and rear rotor seals 903, 904; a rear chain guard 905; a timing chain 906; a first rotor 920; a drive shaft 930; first and second compression cams 941, 942; first and second timing gears 943, 944; a timing shaft 945; a first power stroke cam 946; first and second impellers 951, 952; and a combustion head 961. The internal combustion engine 900 further comprises an ignition system 970 and a fuel metering system 980, each only partially shown, and an engine cooling system 990 that will be discussed below. The ignition system 970 and the fuel metering system 980 may be of the same design as previously discussed with respect to the internal combustion engine 100 of FIGS. 1A through 1D. The engine housing 910 has a central axis 911, an inner surface 912, and front and rear faces 921, 922. The engine housing 910 may comprise steel, aluminum, ceramic or other suitable structural material. The inner surface 912 delimits a first cavity 913 in the engine housing 910. The front and rear faces 921, 922 are essentially parallel and normal the central axis 911.

The first rotor 920 is journalled for rotation with first and second main bearings 931, 932, respectively, within a first cavity 913 and is positioned within the first cavity 913 so as to define compression and exhaust cavities 916, 917, respectively, on opposing sides therein. The compression cavity 916 and exhaust cavity 917 are, therefore, essentially equal in volume. The engine housing 910 further comprises an air inlet aperture 914 and an exhaust aperture 915 therethrough that are in fluid communication with the atmosphere. A conventional muffler system (not shown) may be coupled to the exhaust aperture 915 to quiet the engine 900 and to route exhaust gases away from the air inlet aperture 914. One who is skilled in the art is familiar with the need to take in ambient air to mix with a fuel for an internal combustion engine and the expelling and muffling of exhaust gases to the ambient air.

Figures 2, 9C:
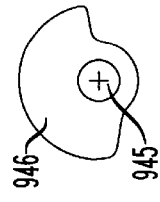
Figures 4, 9C:
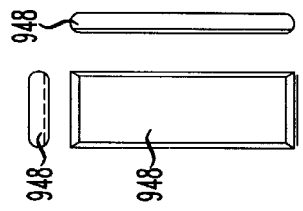
Figures 1, 9C:
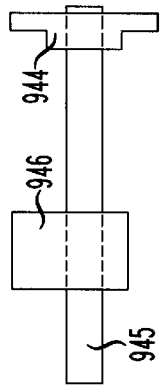
FIG. 9C-1 illustrates a side view of the timing camshaft and the power stroke cam of FIG. 9A.
Figures 3, 9C:
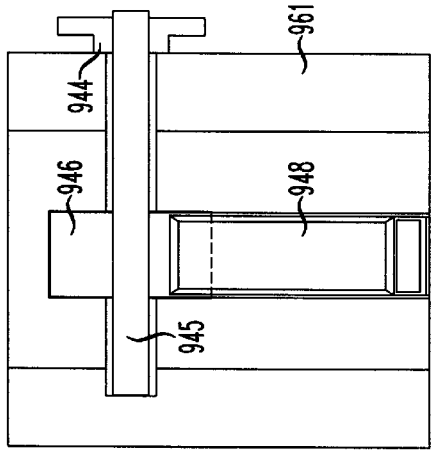
Figure 9B:
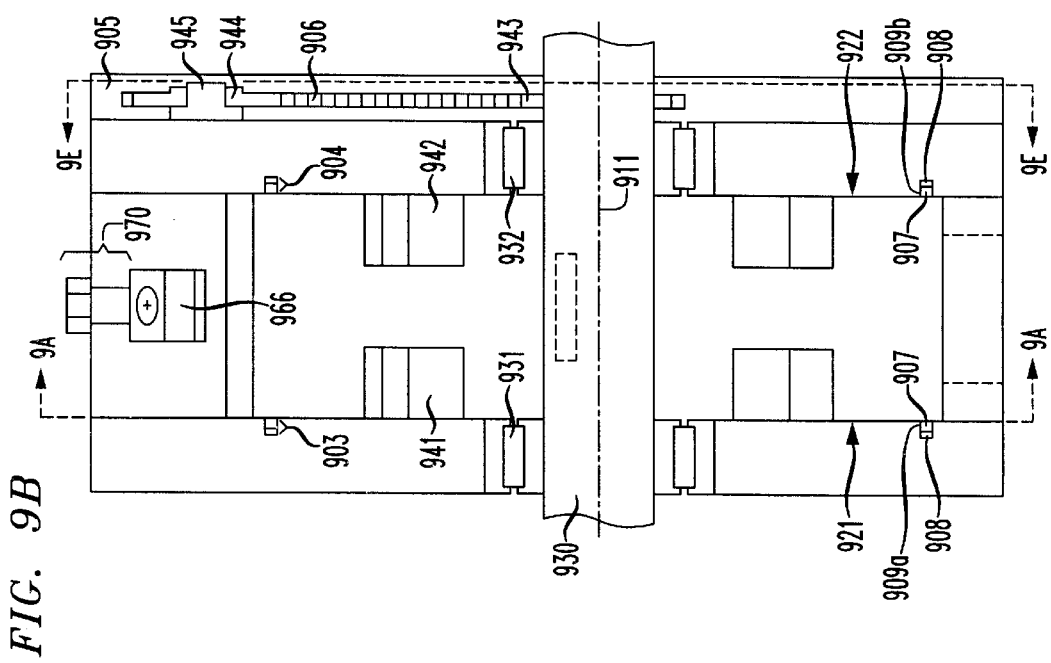
FIG. 9B illustrates a right side, partial sectional view of the internal combustion engine of FIG. 9A as seen along plane 9B—9B.

Referring now to FIGS. 9C-1 through 9C-4 with continuing reference to FIGS. 9A and 9B, illustrated are a profile view (FIG. 9C-1) of the timing shaft 945, a sectional view of the first power stroke cam 946 (FIG. 9C-2), a bottom plan view of a portion of the combustion head 961 (FIG. 9C-3), and a three-view drawing of a power stroke valve 948 (FIG. 9C-4). The first power stroke cam 946 is coupled to the timing shaft 945 in such a manner that the first power stroke cam 946 operates the first power stroke valve 948. As the first and second timing gears 943, 944 are of the same size, the timing shaft 945 rotates one complete revolution for each complete rotation of the drive shaft 930.

Figure 9E:
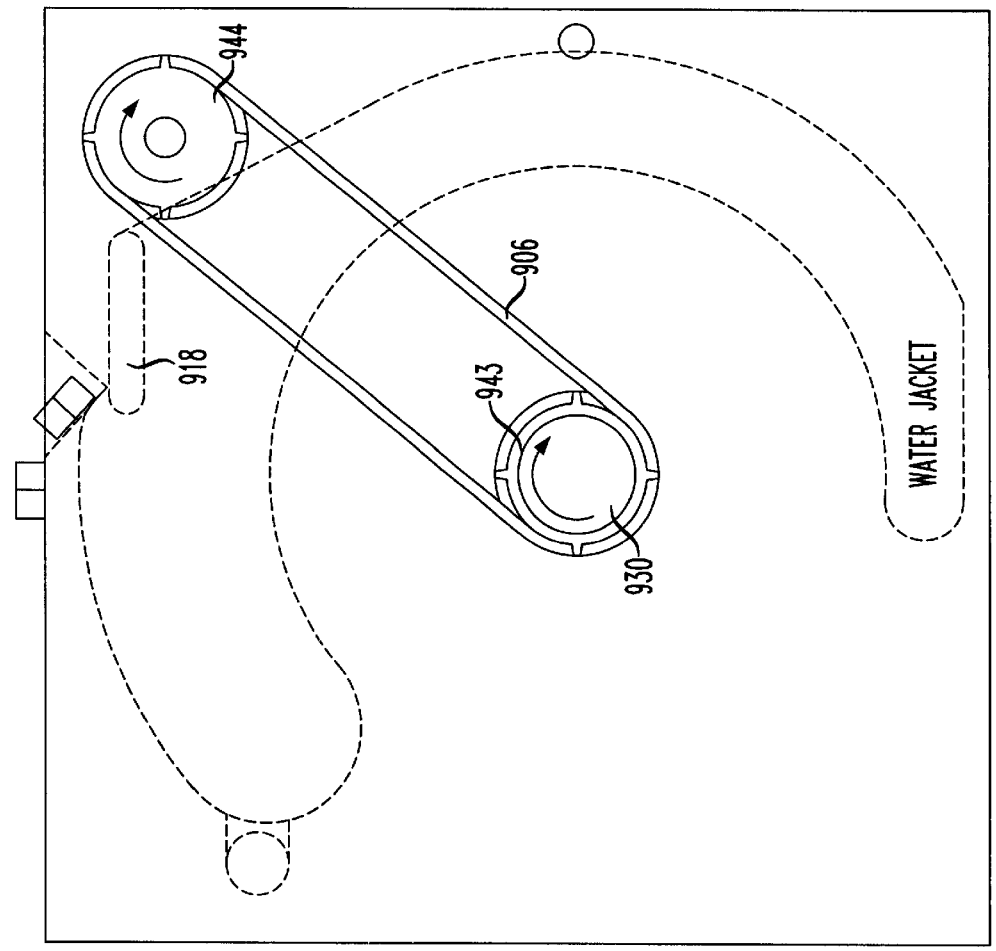
FIG. 9E illustrates a rear elevation view of the internal combustion engine of FIG. 9A as seen at plane 9E—9E.
Figure 9D:
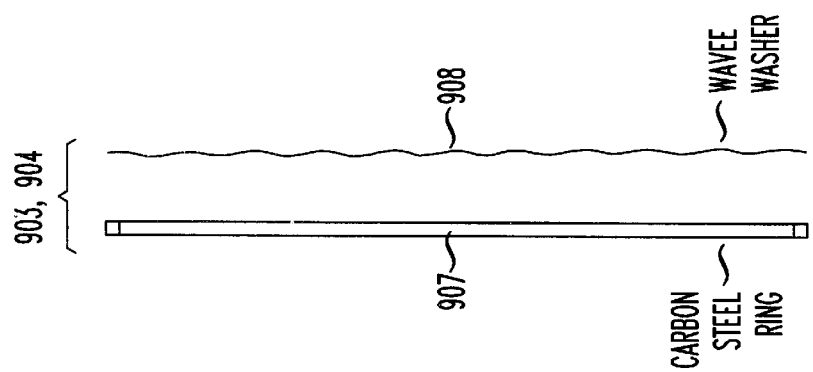
FIG. 9D illustrates an edge view of the front and rear rotor seals of FIG. 9A.

Referring now to FIG. 9D with continuing reference to FIGS. 9A and 9B, illustrated is an edge view of the front and rear rotor seals 903, 904. The front and rear rotor seals 903, 904 comprise a carbon steel ring 907 and a wavee washer 908. It can be seen in FIGS. 9A and 9B that the carbon steel ring 907 and wavee washer 908 are recessed into the front and rear engine covers 901, 902 to seal front and rear faces 921, 922, respectively, of the engine housing 910. Of course, during assembly, the wavee washer 908 is placed first into recesses 909a, 909b, respectively, of the front and rear engine covers 901, 902. The carbon steel ring 907 is inserted last over the wavee washer 908 which holds the carbon steel ring 907 against the respective face 921, 922, thus creating a seal. Of course, one who is skilled in the art will realize that other methods of sealing, e.g., rubber O-ring in place of the wavee washer, the front and rear faces 921, 922 may also be used.

Referring now to FIG. 9E, illustrated is a rear view of the engine 900 with the rear chain guard 905 removed. By comparing FIGS. 9A and 9E, the timing chain 906 is seen to be driven by the first timing gear 943. As the drive shaft 930 rotates, the timing chain 906 rotates the second timing gear 944 and the timing shaft 945 coupled to the power stroke cam 946.

Refer now to FIGS. 9F and 9G-1 through 9G-4 with continuing reference to FIG. 9A. Illustrated in FIG. 9F is a left side view of an alternative embodiment of the engine 900 of FIGS. 9A through 9E. FIGS. 9G-1 through 9G-4 illustrate a profile view (FIG. 9G-1) of the timing shaft 945, a sectional view of first and second power stroke cams 946, 947 (FIGS. 9G-2 and 9G-3), and a bottom plan view of the combustion head 961 (FIG. 9G-4). In this embodiment, the combustion head 961 comprises first and second ignition chambers 966, 967, first and second power stroke valves 948, 949, first and second poppets 964a, 964b, and first and second poppet springs 965a, 965b.

The first and second power stroke cams 946, 947 are coupled to the timing shaft 945 in such a manner that the first power stroke cam 946 operates the first power stroke valve 948 and the second power stroke cam 947 operates the second power stroke valve 949. The first and second power stroke cams 946, 947 are positioned on the timing shaft 945 so that when the first power stroke valve 948 is open, the second power stroke valve 949 is closed. As the first and second timing gears 943, 944 are of the same size, the timing shaft 945 rotates one complete revolution for each complete rotation of the drive shaft 930. Because the second timing gear 944 rotates one revolution for each revolution of the drive shaft 930, using first and second ignition chambers 966, 967 on each rotor 920 revolution permits injecting fuel in the selected ignition chamber, e.g., 967, at a lower pressure while both the associated power stroke valve 949 and the associated poppet 964b are closed. Then, pressure is built in the compression cavity 916 until the pressure overcomes the associated poppet spring 965b and the compressed air mixes in the selected ignition chamber 967.

While the previously described timing methods incorporate mechanical links to the drive shaft, one who is skilled in the art will recognize that more modern methods incorporating electronic sensing of drive shaft rotational position can be employed with any of the previously described embodiments to activate those mechanisms, e.g., the poppets 964a, 964b and the power stroke valves 948, 949, with potentially improved accuracy and reliability. Of course, this technology could also be applied to the single-rotor, single combustion chamber engine of FIGS. 1A through 6J.

It should also be noted that the two ignition chamber engine of FIGS. 9G-1 through 9G-4 may also be employed in a diesel engine embodiment without an ignition system. In this embodiment, whichever chamber 966, 967 is the active combustion chamber is held closed with the associated power stroke valve 948, 949 until the corresponding impeller has passed the associated exhaust gas port 827, 828. Therefore, the proper timing of injection of diesel fuel into the appropriate combustion chamber 966, 967 can be precisely controlled to effect the best possible combination of such factors as: combustion of the fuel/air mixture, the combustion chamber volume, fuel volatility, flame front propagation, etc.

Figure 9H:
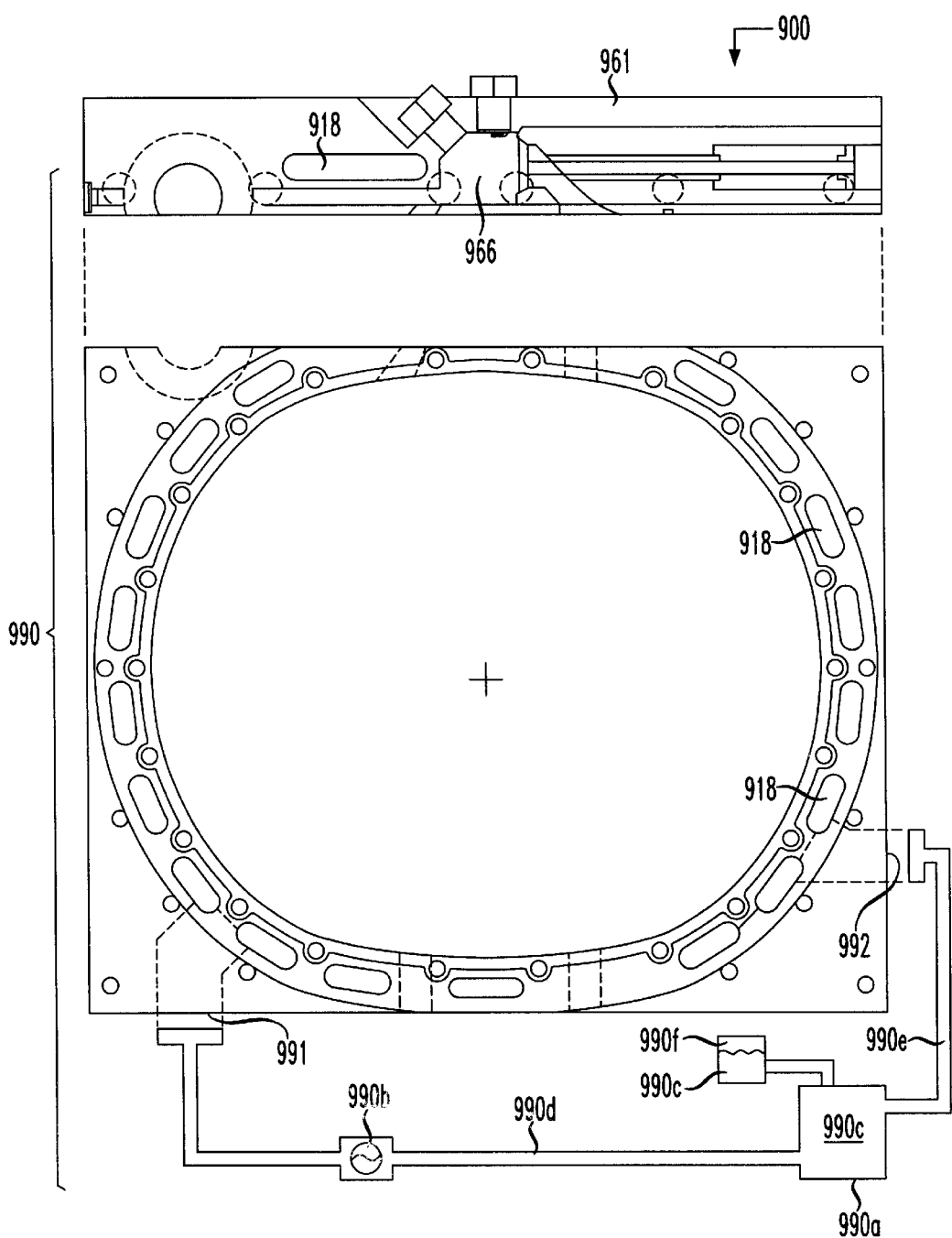
FIG. 9H illustrates an exploded sectional view of the engine of FIG. 9A with a block diagram of accessories illustrating the engine cooling system.

Referring now to FIG. 9H, illustrated is an exploded sectional view of the engine 900 of FIG. 9A with a block diagram of accessories illustrating the engine cooling system 990. As in the engine 100 of FIGS. 1A through 1D, the engine cooling system 990 comprises a radiator 990a; a coolant pump 990b; coolant 990c; supply and return coolant hoses 990d, 990e, a coolant recovery tank 990f, cooling cavities 918 in the engine housing 910 and coolant inlet and outlet apertures 991, 992, respectively. The cooling cavities 918 are disposed throughout the engine housing 910 and combustion head 961 and are configured to carry a coolant, i.e., a heat transfer liquid, therein. It should be observed that a single, larger-than-normal, cooling cavity 918 within the combustion head 961 is so positioned as to remove more heat than usual from proximate the ignition chamber 966. The coolant recovery tank 990f keeps the radiator 990a, hoses 990d, 990e, and the cooling cavities 918 filled with liquid coolant 990c regardless of the temperature of the coolant 990c. The coolant pump 990b is coupled to, and receives power from, the drive shaft 930. One who is skilled in the art is familiar with designs enabling coupling a coolant pump to an engine drive shaft. The coolant pump 990b draws liquid coolant 990c through the supply coolant hoses 990d from the radiator. The coolant pump 990b then pumps the coolant 990c through the cooling cavities 918, back through the return coolant hoses 990e and into the radiator 990a where excess heat is removed. The process continues automatically whenever the engine 900 is operating. In a preferred embodiment, the heat transfer liquid 990c may be a conventional engine antifreeze mixture, i.e., ethylene glycol and water.

Figure 10:
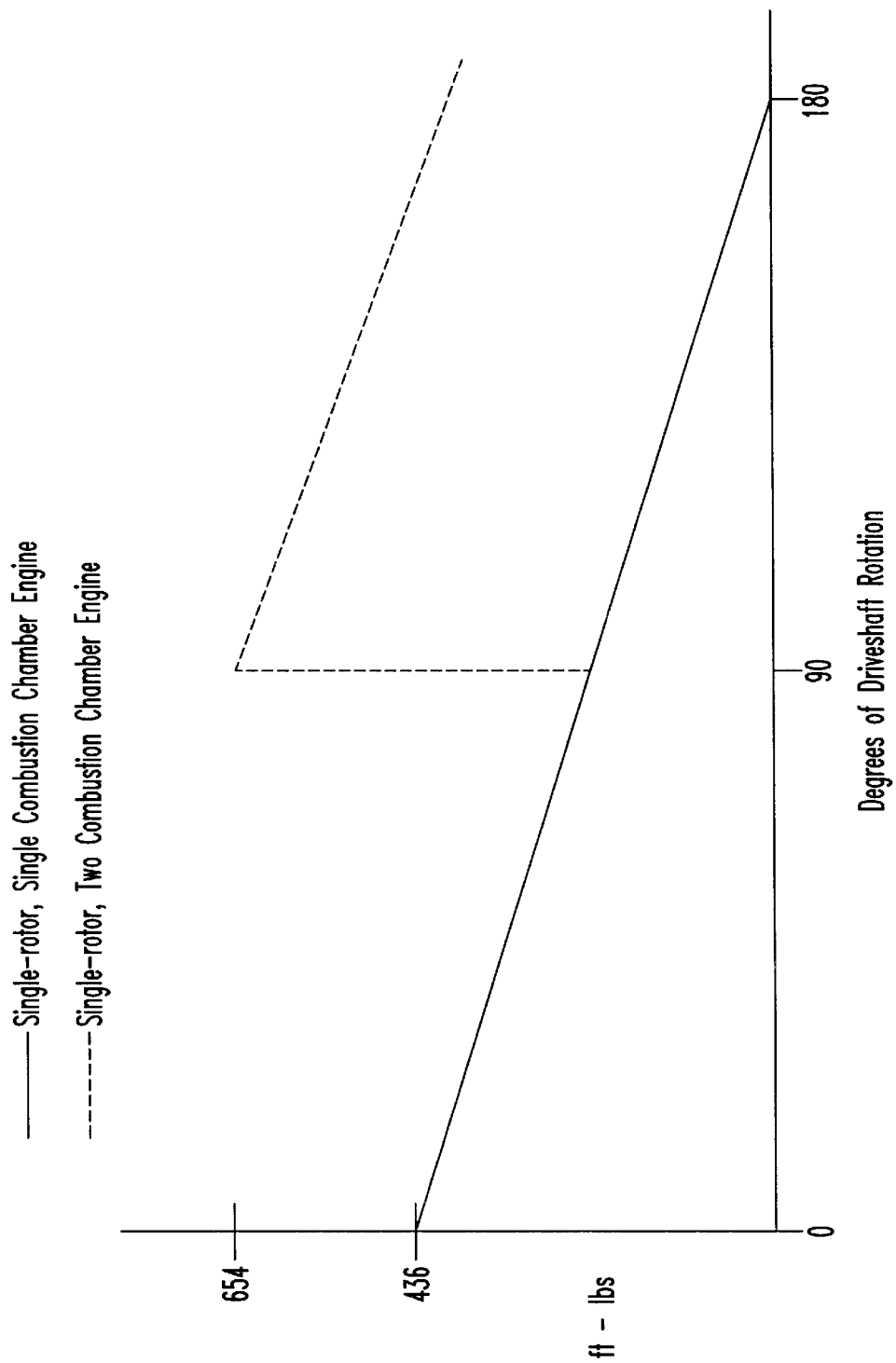
FIG. 10 illustrates a chart of the expected torque of the internal combustion engine of FIGS. 9A through 9H.

Referring now to FIG. 10, illustrated is a chart of the expected torque of the single-rotor, dual combustion chamber, internal combustion engine of FIGS. 9A through 9H. As can be seen, initial torque for the engine having a 9" diameter, 3" maximum thickness, rotor is 436 ft-lbs immediately after the first power stroke valve 948 opens. The torque then decreases linearly until a second firing cycle opens the second power stroke valve 949. However, at 500 rpm, a single chamber engine fires 1000 times in one minute, or almost 17 firings per second. Thus, because of the short interval between firings, torque should remain relatively constant at nearly 654 ft-lbs, the combined torque produced by the first and second combustion chambers 866, 867. Thus, the torque effect of adding a second rotor 822 and combustion chamber 867, as in the engine of FIGS. 8A and 8B, is achieved by forming a second combustion chamber 967 in a single rotor engine 900.

Figure 11:
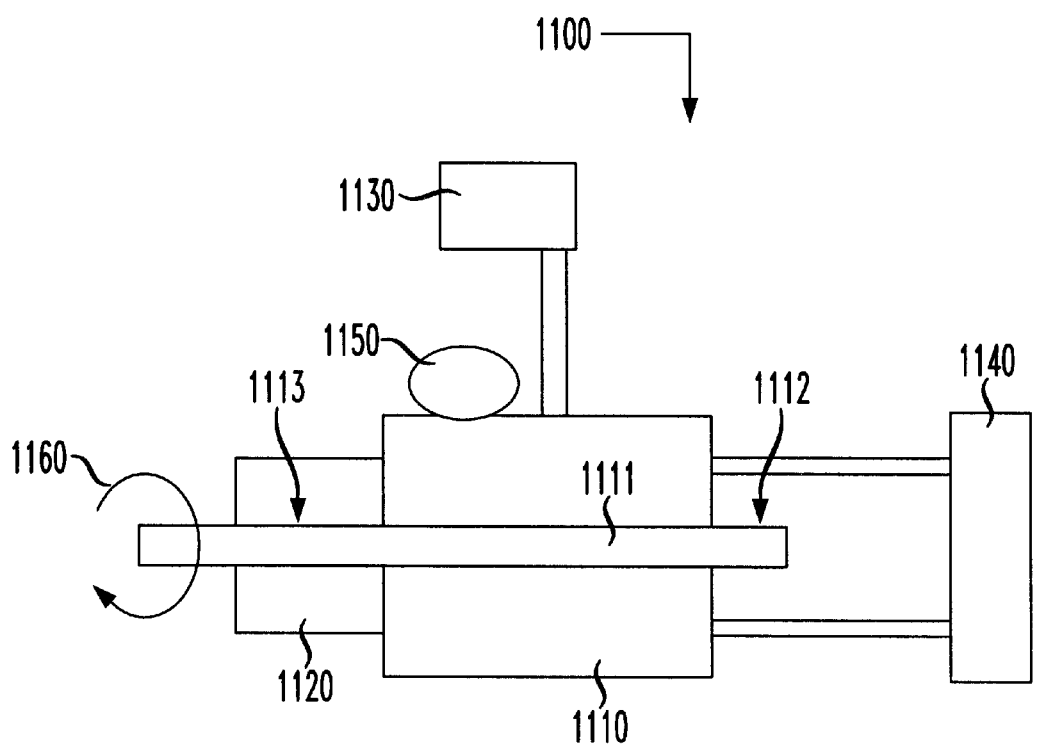
FIG. 11 illustrates a functional block diagram of an internal combustion system constructed according to the principles of the present invention.
Figure 12:
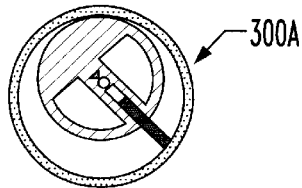
FIGS. 12 through 19 illustrate elevation views of eight different prior art rotary engines.
Figure 13:
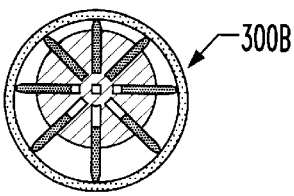
Figure 14:
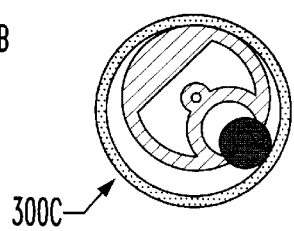
Figure 15:
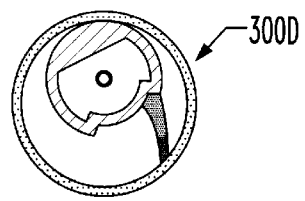
Figure 16:
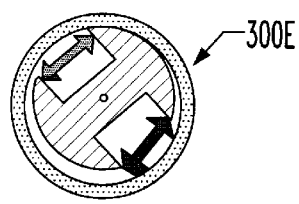
Figure 17:
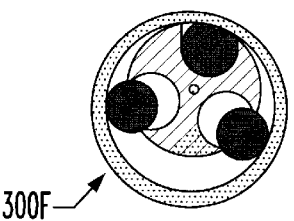
Figure 18:
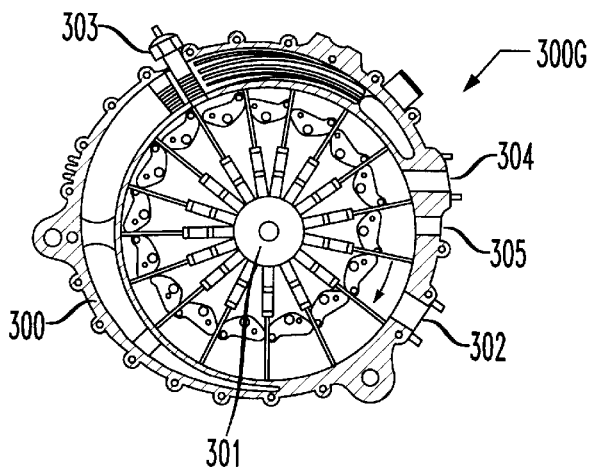
Figure 19:
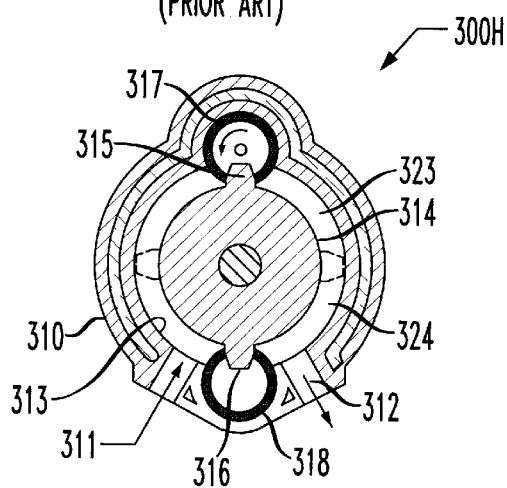

Referring now to FIG. 11, illustrated is a functional block diagram of an internal combustion system 1100 constructed according to the principles of the present invention. The internal combustion system comprises a rotary internal combustion engine 1110 having a drive shaft 1111, a transmission 1120, a fuel system 1130, a cooling system 1140 and an ignition system 1150. The rotary internal combustion engine 1110 conforms to the principles of the present invention described above. Further, the rotary internal combustion engine 1110 may have a front power takeoff shaft 1112 that is a forward extension of the drive shaft 1111, as well as a rearward extension 1113 of the drive shaft 1111 that is coupled to the transmission 1120. Of course, the designation of forward and rearward is arbitrary and one who is skilled in the art will readily conceive of other conventional and non-conventional configurations for the engine 1110, i.e., a transverse engine, in which power is tapped from the engine in other ways.

In any of these configurations, however, the drive shaft 1111 is essential in supplying the power produced by the engine 1110 to accessories such as: a coolant pump, an air conditioning compressor, an alternator, essential components, fuel pump, etc. These accessories may be readily coupled to the front power takeoff shaft 1112 to provide power for their operation. The rearward extension 1113 extends into and is coupled to the transmission 1120. The transmission 1120 is further coupled to additional devices whereby power produced by the engine 1110 is converted into useable torque 1160 that may be further directed to some useful purpose, e.g., driving machinery, powering an electrical generator, or providing motion to wheels of a motor vehicle. Of course, the present invention has many applications to moving vehicles of all kinds, including but not limited to: motor vehicles, aircraft, boats, ships, etc.

Thus, a direct-rotation type, internal combustion rotary engine, that may also be referred to as a positive displacement turbine, has been described. The rotary engine comprises a modified peritrochoidal chamber with a cylindrical rotor that rotates concentrically about a drive shaft located along a central axis of the chamber. The engine further comprises opposed first and second impellers that slide radially within apertures in an outer flywheel of the rotor as the impellers maintain compression or exhaust seals with an inner surface of the modified peritrochoidal chamber. The rotary engine, using only one chamber, avoids the complications of a planetary drive system that is employed in the Wankel engine while developing the power of a traditional V-6 engine.

Although the present invention has been described in detail, those skilled in the art should understand that they can make various changes, substitutions and alterations herein without departing from the spirit and scope of the invention in its broadest form.

What is claimed is:

1. An internal combustion engine, comprising:
    a housing having a first inner surface defining a first cavity therein;
    a first rotor journalled for rotation within said first cavity and situated to define compression and exhaust cavities on opposing sides therein;
    first and second impellers located in, and slidable with respect to, first and second opposing radial apertures in said first rotor; and
    a compression cam fixedly coupled said housing and having a working surface portion that corresponds to a profile of said inner surface to force said first and second impellers to contact said inner surface and a dead surface portion that departs from said profile to allow said first and second impellers to withdraw from said inner surface.

2. The internal combustion engine as recited in claim 1 wherein said profile has a modified peritrochoidal form.

3. The internal combustion engine as recited in claim 1 wherein a peripheral surface of said first rotor seals against at least a portion of said inner surface.

4. The internal combustion engine as recited in claim 1 wherein said first rotor comprises an outer flywheel and an inner hub and further comprising a drive shaft having a longitudinal axis coincident a central axis of said housing, said drive shaft coupled said inner hub, and said outer flywheel having said first and second opposing radial apertures therethrough.

5. The internal combustion engine as recited in claim 1 wherein said first impeller has first and second ends and said first impeller comprises:
    an impeller body having a longitudinal axis, an oil port extending along said longitudinal axis from said first end to said second end, and radial oil ports about and along said longitudinal axis;
    a first roller bearing rotatably coupled said first end, said first roller bearing slidably coupled said compression cam outer surface; and
    a second roller bearing rotatably coupled said second end, said second roller bearing slidably coupled said inner surface.

6. The internal combustion engine as recited in claim 1 wherein said housing has front and rear parallel faces normal a central axis, and further comprising:
    a front engine cover coupled said front face; and
    a rear engine cover coupled said rear face.

7. The internal combustion engine as recited in claim 6 further comprising a lubrication system coupled said front and rear engine covers and in fluid communication with said first rotor and said compression cam.

8. The internal combustion engine as recited in claim 7 wherein said lubrication system comprises:
    a first oil scavenger disposed within said front engine cover and configured to retain a first quantity of a lubricating oil under pressure; and
    a second oil scavenger disposed within said rear engine cover and configured to retain a second quantity of said lubricating oil under pressure.

9. The internal combustion engine as recited in claim 6 wherein said compression cam is coupled said front engine cover and further comprising a combustion cam coupled said first rotor.

10. The internal combustion engine as recited in claim 9 further comprising a fuel metering system coupled said housing and in fluid communication with said compression cavity and said exhaust cavity.

11. The internal combustion engine as recited in claim 10 wherein said housing has a compressed air inlet port and an exhaust gas port therethrough, and wherein said fuel metering system comprises:
 a fuel metering head coupled said housing proximate said compressed air inlet port and said exhaust gas port, said fuel metering head having:
  a preignition chamber therein in fluid communication with said compressed air inlet port;
  a reed valve interposed said fuel metering head and said compressed air inlet port;
  an ignition chamber therein in fluid communication with said preignition chamber;
  an intake poppet interposed said preignition chamber and said ignition chamber; and
  a power stroke valve, interposed said ignition chamber and said exhaust gas port, coupled to and operable by a mechanical linkage between said combustion cam outer surface and said power stroke valve.

12. The internal combustion engine as recited in claim 11 wherein said rear engine cover has a radial rabbet therein and said mechanical linkage comprises:
 a first push bar, located in said radial rabbet and slidably coupled said rear engine cover, having first and second ends, said first end slidably coupled said combustion cam outer surface;
 a second push bar disposed within said fuel metering head and having third and fourth ends, said third end slidably coupled said second end; and
 a pivot bar within said fuel metering head and configured to open said power stroke valve in response to a portion of said combustion cam outer surface.

13. The internal combustion engine as recited in claim 11 further comprising an ignition system coupled said housing and configured to ignite a fuel/air mixture in said ignition chamber.

14. The internal combustion engine as recited in claim 13 wherein said ignition system comprises an ignition plug coupled said fuel metering head and extending into said ignition chamber, said ignition plug configured to ignite said fuel/air mixture.

15. The internal combustion engine as recited in claim 11 further comprising:
 a timing shaft rotatably coupled said drive shaft; and
 a power stroke cam coupled to said timing shaft and configured to operate said power stroke valve.

16. The internal combustion engine as recited in claim 11 further comprising:
 an intake aperture through said housing and in fluid communication between the atmosphere and said compression cavity; and
 an exhaust aperture through said housing and in fluid communication between the atmosphere and said exhaust cavity.

17. The internal combustion engine as recited in claim 11 further comprising a cooling system coupled said housing.

18. The internal combustion engine as recited in claim 17 wherein said cooling system comprises:
 coolant passages through said housing;
 a radiator in fluid communication with said coolant passages; and
 a coolant pump coupled to said first rotor and configured to circulate a coolant through said coolant passages and said radiator.

19. The internal combustion engine as recited in claim 11 further comprising:
 a second inner surface of said housing defining a second cavity therein parallel and proximate said first cavity;
 a second rotor journalled for rotation within said second cavity and situated to define compression and exhaust cavities on opposing sides therein;
 third and fourth impellers located in, and slidable with respect to, third and fourth opposing radial apertures in said second rotor, said third and fourth opposing radial apertures having an angular offset from said first and second opposing radial apertures; and
 a second compression cam fixedly coupled said housing and having a second working surface portion that corresponds to a second profile of said second inner surface to force said third and fourth impellers to contact said second inner surface and a second dead surface portion that departs from said second profile to allow said third and fourth impellers to withdraw from said inner surface.

20. The internal combustion engine as recited in claim 19 wherein said angular offset is about 90 degrees.

21. A method of manufacturing an internal combustion engine, comprising:
 providing a housing having a first inner surface defining a first cavity therein;
 journalling a first rotor for rotation within said first cavity and situating said first rotor to define compression and exhaust cavities on opposing sides therein;
 locating first and second impellers in, and slidable with respect to, first and second opposing radial apertures in said first rotor; and
 fixedly coupling a compression cam to said housing, said compression cam having a working surface portion that corresponds to a profile of said inner surface to force said first and second impellers to contact said inner surface and a dead surface portion that departs from said profile to allow said first and second impellers to withdraw from said inner surface.

22. The method as recited in claim 21 wherein fixedly coupling includes fixedly coupling wherein said profile has a modified peritrochoidal form.

23. The method as recited in claim 21 wherein journalling includes journalling a first rotor having a peripheral surface that seals against at least a portion of said inner surface.

24. The method as recited in claim 21 wherein journalling includes journalling wherein said first rotor comprises an outer flywheel and an inner hub and further comprising coupling a drive shaft having a longitudinal axis coincident a central axis of said housing to said inner hub, and said outer flywheel has said first and second opposing radial apertures therethrough.

25. The method as recited in claim 21 wherein locating includes locating a first impeller having first and second ends and wherein said first impeller comprises:
 an impeller body having a longitudinal axis, an oil port extending along said longitudinal axis from said first end to said second end, and radial oil ports about and along said longitudinal axis;
 a first roller bearing rotatably coupled said first end, said first roller bearing slidably coupled said compression cam outer surface; and
 a second roller bearing rotatably coupled said second end, said second roller bearing slidably coupled said inner surface.

26. The method as recited in claim 21 wherein said housing has front and rear parallel faces normal a central axis, and further comprising:

coupling a front engine cover to said front face; and coupling a rear engine cover to said rear face.

27. The method as recited in claim 26 further comprising coupling a lubrication system to said front and rear engine covers and in fluid communication with said first rotor and said compression cam.

28. The method as recited in claim 27 wherein coupling a lubrication system comprises:
- disposing a first oil scavenger within said front engine cover and configured to retain a first quantity of a lubricating oil under pressure; and
- disposing a second oil scavenger within said rear engine cover and configured to retain a second quantity of said lubricating oil under pressure.

29. The method as recited in claim 26 wherein coupling a front engine cover includes coupling a front engine cover wherein said compression cam is coupled said front engine cover and further comprising coupling a combustion cam to said first rotor.

30. The method as recited in claim 29 further comprising coupling a fuel metering system to said housing, said fuel metering system in fluid communication with said compression cavity and said exhaust cavity.

31. The method as recited in claim 30 wherein providing includes providing a housing having a compressed air inlet port and an exhaust gas port therethrough, and wherein coupling a fuel metering system includes coupling a fuel metering system comprising:
- a fuel metering head coupled said housing proximate said compressed air inlet port and said exhaust gas port, said fuel metering head having:
  - a preignition chamber therein in fluid communication with said compressed air inlet port;
  - a reed valve interposed said fuel metering head and said compressed air inlet port;
  - an ignition chamber therein in fluid communication with said preignition chamber;
  - an intake poppet interposed said preignition chamber and said ignition chamber; and
  - a power stroke valve, interposed said ignition chamber and said exhaust gas port, coupled to and operable by a mechanical linkage between said combustion cam outer surface and said power stroke valve.

32. The method as recited in claim 31 wherein coupling a rear engine cover includes coupling a rear engine cover having a radial rabbet therein and said mechanical linkage comprises:
- a first push bar, located in said radial rabbet and slidably coupled said rear engine cover, having first and second ends, said first end slidably coupled said combustion cam outer surface;
- a second push bar disposed within said fuel metering head and having third and fourth ends, said third end slidably coupled said second end; and
- a pivot bar within said fuel metering head and configured to open said power stroke valve in response to a portion of said combustion cam outer surface.

33. The method as recited in claim 31 further comprising coupling an ignition system to said housing, said ignition system configured to ignite a fuel/air mixture in said ignition chamber.

34. The method as recited in claim 33 wherein coupling an ignition system includes coupling an ignition system comprising an ignition plug coupled said fuel metering head and extending into said ignition chamber, said ignition plug configured to ignite said fuel/air mixture.

35. The method as recited in claim 31 wherein coupling a fuel metering system includes coupling a fuel metering system further comprising:

a timing shaft rotatably coupled said drive shaft; and a power stroke cam coupled to said timing shaft and configured to operate said power stroke valve.

36. The method as recited in claim 31 wherein providing includes providing a housing having:
- an intake aperture through said housing and in fluid communication between the atmosphere and said compression cavity; and
- an exhaust aperture through said housing and in fluid communication between the atmosphere and said exhaust cavity.

37. The method as recited in claim 31 further comprising coupling a cooling system to said housing.

38. The method as recited in claim 37 wherein coupling a cooling system includes coupling a cooling system comprising:
- coolant passages through said housing;
- a radiator in fluid communication with said coolant passages; and
- a coolant pump coupled to said first rotor and configured to circulate a coolant through said coolant passages and said radiator.

39. The internal combustion engine as recited in claim 31 wherein providing includes providing a housing having:
- a second inner surface of said housing defining a second cavity therein parallel and proximate said first cavity;
- a second rotor journalled for rotation within said second cavity and situated to define compression and exhaust cavities on opposing sides therein;
- third and fourth impellers located in, and slidable with respect to, third and fourth opposing radial apertures in said second rotor, said third and fourth opposing radial apertures having an angular offset from said first and second opposing radial apertures; and
- a second compression cam fixedly coupled said housing and having a second working surface portion that corresponds to a second profile of said second inner surface to force said third and fourth impellers to contact said second inner surface and a second dead surface portion that departs from said second profile to allow said third and fourth impellers to withdraw from said inner surface.

40. The internal combustion engine as recited in claim 39 wherein providing includes providing a housing having an angular offset of about 90 degrees.

41. An internal combustion system, comprising:
- an internal combustion engine having:
  - a housing having a first inner surface defining a first cavity therein;
  - a first rotor journalled for rotation within said first cavity and situated to define compression and exhaust cavities on opposing sides therein;
  - first and second impellers located in, and slidable with respect to, first and second opposing radial apertures in said first rotor; and
  - a compression cam fixedly coupled said housing and having a working surface portion that corresponds to a profile of said inner surface to force said first and second impellers to contact said inner surface and a dead surface portion that departs from said profile to allow said first and second impellers to withdraw from said inner surface; and
- a transmission coupled to said internal combustion engine.

42. The internal combustion system as recited in claim 41 wherein said profile has a modified peritrochoidal form.

43. The internal combustion system as recited in claim 41 wherein a peripheral surface of said first rotor seals against at least a portion of said inner surface.

44. The internal combustion system as recited in claim 41 wherein said first rotor comprises an outer flywheel and an inner hub and further comprising a drive shaft having a longitudinal axis coincident a central axis of said housing, said drive shaft coupled said inner hub, and said outer flywheel having said first and second opposing radial apertures therethrough.

45. The internal combustion system as recited in claim 41 wherein said first impeller has first and second ends and said first impeller comprises:
- an impeller body having a longitudinal axis, an oil port extending along said longitudinal axis from said first end to said second end, and radial oil ports about and along said longitudinal axis;
- a first roller bearing rotatably coupled said first end, said first roller bearing slidably coupled said compression cam outer surface; and
- a second roller bearing rotatably coupled said second end, said second roller bearing slidably coupled said inner surface.

46. The internal combustion system as recited in claim 41 wherein said housing has front and rear parallel faces normal a central axis, and further comprising:
- a front engine cover coupled said front face; and
- a rear engine cover coupled said rear face.

47. The internal combustion system as recited in claim 46 further comprising a lubrication system coupled said front and rear engine covers and in fluid communication with said first rotor and said compression cam.

48. The internal combustion system as recited in claim 47 wherein said lubrication system comprises:
- a first oil scavenger disposed within said front engine cover and configured to retain a first quantity of a lubricating oil under pressure; and
- a second oil scavenger disposed within said rear engine cover and configured to retain a second quantity of said lubricating oil under pressure.

49. The internal combustion system as recited in claim 46 wherein said compression cam is coupled said front engine cover and further comprising a combustion cam coupled said first rotor.

50. The internal combustion system as recited in claim 49 further comprising a fuel metering system coupled said housing and in fluid communication with said compression cavity and said exhaust cavity.

51. The internal combustion system as recited in claim 50 wherein said housing has a compressed air inlet port and an exhaust gas port therethrough, and wherein said fuel metering system comprises:
- a fuel metering head coupled said housing proximate said compressed air inlet port and said exhaust gas port, said fuel metering head having:
  - a preignition chamber therein in fluid communication with said compressed air inlet port;
  - a reed valve interposed said fuel metering head and said compressed air inlet port;
  - an ignition chamber therein in fluid communication with said preignition chamber;
  - an intake poppet interposed said preignition chamber and said ignition chamber; and
  - a power stroke valve, interposed said ignition chamber and said exhaust gas port, coupled to and operable by a mechanical linkage between said combustion cam outer surface and said power stroke valve.

52. The internal combustion system as recited in claim 51 wherein said rear engine cover has a radial rabbet therein and said mechanical linkage comprises:
- a first push bar, located in said radial rabbet and slidably coupled said rear engine cover, having first and second ends, said first end slidably coupled said combustion cam outer surface;
- a second push bar disposed within said fuel metering head and having third and fourth ends, said third end slidably coupled said second end; and
- a pivot bar within said fuel metering head and configured to open said power stroke valve in response to a portion of said combustion cam outer surface.

53. The internal combustion system as recited in claim 51 further comprising an ignition system coupled said housing and configured to ignite a fuel/air mixture in said ignition chamber.

54. The internal combustion system as recited in claim 53 wherein said ignition system comprises an ignition plug coupled said fuel metering head and extending into said ignition chamber, said ignition plug configured to ignite said fuel/air mixture.

55. The internal combustion system as recited in claim 51 further comprising:
- a timing shaft rotatably coupled said drive shaft; and
- a power stroke cam coupled to said timing shaft and configured to operate said power stroke valve.

56. The internal combustion system as recited in claim 51 further comprising:
- an intake aperture through said housing and in fluid communication between the atmosphere and said compression cavity; and
- an exhaust aperture through said housing and in fluid communication between the atmosphere and said exhaust cavity.

57. The internal combustion system as recited in claim 51 further comprising a cooling system coupled said housing.

58. The internal combustion system as recited in claim 57 wherein said cooling system comprises:
- coolant passages through said housing;
- a radiator in fluid communication with said coolant passages; and
- a coolant pump coupled to said first rotor and configured to circulate a coolant through said coolant passages and said radiator.

59. The internal combustion system as recited in claim 51 further comprising:
- a second inner surface of said housing defining a second cavity therein parallel and proximate said first cavity;
- a second rotor journalled for rotation within said second cavity and situated to define compression and exhaust cavities on opposing sides therein;
- third and fourth impellers located in, and slidable with respect to, third and fourth opposing radial apertures in said second rotor, said third and fourth opposing radial apertures having an angular offset from said first and second opposing radial apertures; and
- a second compression cam fixedly coupled said housing and having a second working surface portion that corresponds to a second profile of said second inner surface to force said third and fourth impellers to contact said second inner surface and a second dead surface portion that departs from said second profile to allow said third and fourth impellers to withdraw from said inner surface.

60. The internal combustion system as recited in claim 59 wherein said angular offset is about 90 degrees.

\* \* \* \* \*